(12) United States Patent
Passot et al.

(10) Patent No.: US 11,467,602 B2
(45) Date of Patent: Oct. 11, 2022

(54) SYSTEMS AND METHODS FOR TRAINING A ROBOT TO AUTONOMOUSLY TRAVEL A ROUTE

(71) Applicant: Brain Corporation, San Diego, CA (US)

(72) Inventors: Jean-Baptiste Passot, Solana Beach, CA (US); Andrew Smith, San Diego, CA (US); Botond Szatmary, San Diego, CA (US); Borja Ibarz Gabardos, La Jolla, CA (US); Cody Griffin, San Digeo, CA (US); Jaldert Rombouts, San Diego, CA (US); Oleg Sinyavskiy, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 581 days.

(21) Appl. No.: 16/168,368

(22) Filed: Oct. 23, 2018

(65) Prior Publication Data

US 2019/0121365 A1    Apr. 25, 2019

Related U.S. Application Data

(63) Continuation of application No. 15/152,425, filed on May 11, 2016, now abandoned.

(51) Int. Cl.
*A47L 9/00* (2006.01)
*G05D 1/02* (2020.01)
(Continued)

(52) U.S. Cl.
CPC .......... *G05D 1/0274* (2013.01); *A47L 9/2826* (2013.01); *A47L 9/2852* (2013.01);
(Continued)

(58) Field of Classification Search
None
See application file for complete search history.

(56) References Cited

U.S. PATENT DOCUMENTS

| 5,204,814 A | 4/1993 | Noonan et al. |
| 6,718,258 B1 * | 4/2004 | Barton .................. G01C 21/32 340/991 |

(Continued)

FOREIGN PATENT DOCUMENTS

WO    2015041036 A1    3/2016

OTHER PUBLICATIONS

Webpage TECNALIA—Limaccio Autonomous cleaning robot, located at https://www.youtube.com/watch?v=4GJ00EBbBfQ (Year: 2013).*

(Continued)

*Primary Examiner* — James M McPherson
(74) *Attorney, Agent, or Firm* — Reed Smith LLP; Sidharth Kapoor

(57) ABSTRACT

Systems and methods for training a robot to autonomously travel a route. In one embodiment, a robot can detect an initial placement in an initialization location. Beginning from the initialization location, the robot can create a map of a navigable route and surrounding environment during a user-controlled demonstration of the navigable route. After the demonstration, the robot can later detect a second placement in the initialization location, and then autonomously navigate the navigable route. The robot can then subsequently detect errors associated with the created map. Methods and systems associated with the robot are also disclosed.

18 Claims, 20 Drawing Sheets

(51) Int. Cl.
*A47L 9/28* (2006.01)
*A47L 11/40* (2006.01)
*G05D 1/00* (2006.01)

(52) U.S. Cl.
CPC ....... *A47L 11/4011* (2013.01); *A47L 11/4061* (2013.01); *G05D 1/0088* (2013.01); *G05D 1/0221* (2013.01); *G05D 1/0246* (2013.01); *A47L 2201/04* (2013.01); *G05D 2201/0203* (2013.01)

(56) References Cited

U.S. PATENT DOCUMENTS

| | | | |
|---|---|---|---|
| 8,774,970 | B2 | 7/2014 | Knopow et al. |
| 8,843,244 | B2* | 9/2014 | Phillips ................ G05D 1/0094 701/2 |
| 9,538,702 | B2* | 1/2017 | Balutis .................... B25J 5/007 |
| 2014/0278055 | A1* | 9/2014 | Wang .................... G16B 99/00 701/409 |
| 2016/0062361 | A1 | 3/2016 | Nakano et al. |

OTHER PUBLICATIONS

Prior parent U.S. Appl. No. 15/152,425, filed May 11, 2016.
Supplementary European Search Report, dated Nov. 11, 2019.

* cited by examiner

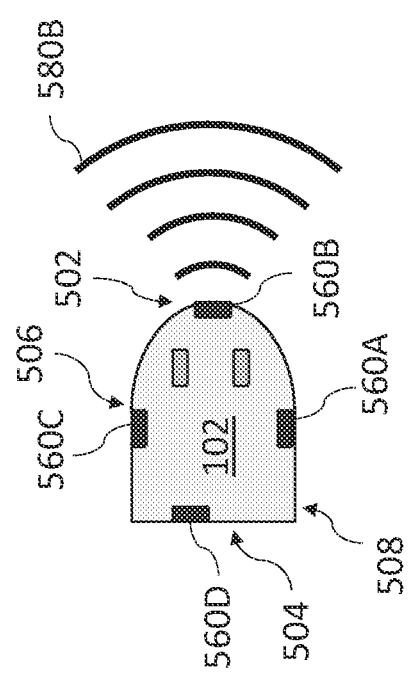

SYSTEMS AND METHODS FOR TRAINING A ROBOT TO AUTONOMOUSLY TRAVEL A ROUTE

This application is a continuation of U.S. patent application Ser. No. 15/152,425 filed May 11, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to, inter alia, robotic systems and methods of utilizing the same. Specifically, in one aspect, the present disclosure relates to systems and methods for training and operating a robot to autonomously travel a route.

Background

Presently, programming robots can often involve exhaustive coding that anticipates, or attempts to anticipate, every situation in which the robot can encounter. Not only is such an approach costly from a time, energy, and computer resource perspective, but this approach can also limit the capabilities of the robot. For example, many robots can only be effective in controlled environments with predictable or predefined conditions. These robots may not be effective in dynamically changing environments and/or new environments for which the robot was not specifically programmed. Where robots are programmed with general capabilities, the robots may be useful in many different tasks, but may be ineffective or inefficient at any particular one of those tasks. On the flipside, robots that are programmed to perform specific tasks effectively and efficiently may be limited to those tasks and not able to perform others. Similarly, many present robots can require expert technicians and other highly skilled workers to program and operate them. This requirement increases the time and costs of operating the robots.

These challenges are particularly salient in programming robots to travel in routes. For example, in order to program a robot to autonomously navigate a desired path from a first point to a second point, a programmer may have to program a map and also identify each point on the map to which the robot should travel, along with the order or logic in which the robot should travel to those points. That programmer may have to program the robot for each environment and input each and every route desired, along with maps of the environment. In the alternative, if the programmer programs general rules and logic for the robot to determine routes, that robot may be slow and inefficient in following any particular route. In either case, such programming can be time-consuming and also require highly skilled workers to operate the robot. Accordingly, there is a need for improved systems and methods for programming robots to travel routes.

SUMMARY

The foregoing needs are satisfied by the present disclosure, which provides for, inter alia, apparatus and methods for training and operating a robot for autonomous navigation. Example implementations described herein have innovative features, no single one of which is indispensable or solely responsible for their desirable attributes. Without limiting the scope of the claims, some of the advantageous features will now be summarized.

In some implementations of this disclosure, a robot can learn a route by demonstration and later repeat the demonstrated route while autonomously navigating.

In a first aspect a robot is disclosed. In one exemplary implementation, the robot includes a mapping and localization unit configured to create a map of a navigable route and surrounding environment during a demonstration of the navigable route to the robot beginning from an initialization location. The robot also includes a navigation unit configured to autonomously navigate the robot using the map.

In one variant, the navigation unit of the robot is also configured to determine not to autonomously navigate at least a portion of the navigable route.

In another variant, the robot further includes a sensor unit configured to generate sensor data indicative at least in part of objects within a sensor range, wherein the navigation unit of the robot is further configured to autonomously navigate based at least in part on the generated sensor data.

In another variant, the robot further has a first actuator unit configured to actuate a brush. In another variant, the robot also has a second actuator unit configured to turn the robot.

In another variant, the robot further has a processor configured to associate a position on the map with actuation of the first actuator unit. In another variant, the robot includes a processor configured to associate a position on the map with actuation of the second actuator unit.

In another variant, the robot includes a user interface unit configured to receive a selection of a created map from a user, wherein the robot autonomously navigates at least in part on the received selection.

In another variant, the robot further has a map evaluation unit configured to correct errors in the map. In another variant, the correction of errors includes machine learning that associates at least one of the errors in the map with at least a portion of a corrected map.

In another variant, the robot further includes a communication unit configured to communicate with a server, wherein the robot sends the map to the server and receives a verification of the quality of the map.

In a second aspect, methods of training the robot are disclosed. In one exemplary implementation, the method includes detecting a first placement of the robot in an initialization location, creating a map of a navigable route and surrounding environment during a demonstration of the navigable route to the robot beginning from the initialization location, detecting a second placement of the robot in the initialization location, and causing the robot to autonomously navigate at least a portion of the navigable route from the initialization location.

In one variant, the method further includes evaluating the created map for errors, and based at least in part on the errors, requesting the user to demonstrate the navigable route again to the robot.

In another variant, the method further includes correcting errors in the map. In another variant, the method further comprises determining not to autonomously navigate at least a portion of the navigable route.

In another variant, the method further includes associating the map of the navigable route and surrounding environment with the initialization location.

In another variant, the method further includes mapping on the created map an action performed by the robot on the navigable route.

In a third aspect, methods of using the robot are disclosed. In one exemplary implementation, the method includes detecting a first placement of the robot in an initialization location, creating a map of a navigable route and surrounding environment during a demonstration of the navigable route to the robot beginning from the initialization location, detecting a second placement of the robot in the initialization location, and causing the robot to autonomously navigate at least a portion of the navigable route from the initialization location.

In one variant, the method further includes associating the map of the navigable route and surrounding environment with the initialization location.

In another variant, the method further includes mapping on the created map an action performed by the robot on the navigable route.

In a fourth aspect, a non-transitory computer readable medium is disclosed. In one exemplary implementation, a non-transitory computer-readable storage medium having a plurality of instructions stored thereon is disclosed. The instructions being executable by a processing apparatus to operate a robot, the instructions configured to, when executed by the processing apparatus, cause the processing apparatus to: detect a first placement of the robot in an initialization location; create a map of a navigable route and surrounding environment during a demonstration of the navigable route to the robot beginning from the initialization location; detect a second placement of the robot in the initialization location; and cause the robot to autonomously navigate at least a portion of the navigable route from the initialization location.

In one variant, the non-transitory computer-readable storage medium includes instructions that when executed by the processing apparatus, further cause the processing apparatus to evaluate the created map for errors, and based at least in part on the errors, request the user to demonstrate the navigable route again to the robot.

In another variant, the non-transitory computer-readable storage medium includes instructions that when executed by the processing apparatus, further cause the processing apparatus to correct errors in the map.

In another variant, the non-transitory computer-readable storage medium includes instructions that when executed by the processing apparatus, further cause the processing apparatus to provide instructions to the robot to avoid temporary placed obstacles while autonomously navigating the navigable route.

In another variant, the non-transitory computer-readable storage medium includes instructions that when executed, further cause the processing apparatus to determine not to autonomously navigate at least a portion of the navigable route.

In another variant, the non-transitory computer-readable storage medium includes instructions that when executed, further cause the processing apparatus to associate the map of the navigable route and surrounding environment with the initialization location.

In another variant, the creation of the map of a navigable route and surrounding environment further comprises instructions configured to sense the surrounding environment with a sensor.

In another variant, the non-transitory computer-readable storage medium includes instructions that when executed, further cause the processing apparatus to communicate with a server, wherein the robot sends the map to the server and receives a verification of the quality of the map.

In a fifth aspect, an environment and a robot are disclosed. In one exemplary implementation, the robot includes a mapping and localization unit configured to create a map of a navigable route and surrounding environment during a demonstration of the navigable route to the robot beginning from an initialization location. The robot also includes a navigation unit configured to autonomously navigate the robot using the map.

In one variant, the navigation unit of the robot is also configured to determine not to autonomously navigate at least a portion of the navigable route. This determination includes a determination to avoid an obstacle of the environment.

In another variant, the robot further includes a sensor unit configured to generate sensor data indicative at least in part of objects within a sensor range, wherein the navigation unit of the robot is further configured to autonomously navigate the environment based at least in part on the generated sensor data.

In another variant, the robot further has a first actuator unit configured to actuate a brush for cleaning. In another variant, the robot also has a second actuator unit configured to turn the robot in the environment.

In another variant, the robot further has a processor configured to associate a position on the map with actuation of the first actuator unit. In another variant, the robot includes a processor configured to associate a position on the map with actuation of the second actuator unit.

There are additional aspects and implementations described in this disclosure. For example, some implementations include a non-transitory computer-readable storage medium having a plurality of instructions stored thereon, the instructions being executable by a processing apparatus to operate a robot, the instructions configured to, when executed by the processing apparatus, cause the processing apparatus to: detect a first placement of the robot in an initialization location; create a map of a navigable route and surrounding environment during a demonstration of the navigable route to the robot beginning from the initialization location; detect a second placement of the robot in the initialization location; and cause the robot to autonomously navigate at least a portion of the navigable route from the initialization location.

In some implementations, the non-transitory computer-readable storage medium includes instructions that when executed by the processing apparatus, further cause the processing apparatus to evaluate the created map for errors, and based at least in part on the errors, request the user to demonstrate the navigable route again to the robot. In some implementations, the errors include at least one of a discontinuity of the navigable route in the map and a discontinuity in the surrounding environment in the map. In some implementations, the errors include at least overlapping objects. In some implementations, the errors include a failure to form a closed loop. In some implementations, the errors include predetermined error patterns in the map.

In some implementations, the non-transitory computer-readable storage medium includes instructions that when executed by the processing apparatus, further cause the processing apparatus to correct errors in the map. In some implementations, the correction of errors includes machine learning that associates at least one of the errors in the map with at least a portion of a corrected map.

In some implementations, the non-transitory computer-readable storage medium includes instructions that when executed by the processing apparatus, further cause the processing apparatus to provide instructions to the robot to avoid temporary placed obstacles while autonomously navigating the navigable route. In some implementations, the non-transitory computer-readable storage medium includes instructions that when executed, further cause the processing apparatus to determine not to autonomously navigate at least a portion of the navigable route. In some implementations, the determination not to autonomously navigate at least a portion of the navigable route includes a determination to avoid an obstacle.

In some implementations, the robot further comprises instructions configured to cause the processing apparatus to receive a selection of the navigable route from a user interface. In some implementations, the non-transitory computer-readable storage medium includes instructions that when executed, further cause the processing apparatus to associate the map of the navigable route and surrounding environment with the initialization location.

In some implementations, the causing of the robot to autonomously navigate further comprises instructions configured to cause the processing apparatus to determine the navigable route based at least in part on the association of the map of the navigable route and surrounding environment to the initialization location. In some implementations, the causing of the robot to autonomously navigate further comprises instructions configured to cause the processing apparatus to navigate based at least in part on the created map. In some implementations, the robot is a floor cleaner. In some implementations, the robot is a floor scrubber.

In some implementations, the created map comprises an indication representative at least in part of an action performed by the robot on the navigable route. In some implementations, the action is cleaning a floor. In some implementations, the action is a turn.

In some implementations, the creation of the map of a navigable route and surrounding environment further comprises instructions configured to sense the surrounding environment with a sensor. In some implementations, the creation of the map of a navigable route and surrounding environment further comprises instructions configured to sense the surrounding environment with a three-dimensional sensor.

In some implementations, the non-transitory computer-readable storage medium includes instructions that when executed, further cause the processing apparatus to communicate with a server, wherein the robot sends the map to the server and receives a verification of the quality of the map.

As another example, some implementations include a method of operating a robot, comprising: detecting a first placement of the robot in an initialization location; causing a creation of a map of a navigable route and surrounding environment during a demonstration of the navigable route to the robot beginning from the initialization location; detecting a second placement of the robot in the initialization location; and causing the robot to autonomously navigate at least a portion of the navigable route from the initialization location.

In some implementations, the method further comprises evaluating the created map for errors, and based at least in part on the errors, requesting the user to demonstrate the navigable route again to the robot. In some implementations, evaluating the created map for errors includes identifying overlapping objects. In some implementations, evaluating the created map for errors includes identifying a failure to form a closed loop. In some implementations, evaluating the created map for errors includes identifying predetermined patterns in the map. In some implementations, the method further comprises sending the map to a server and receiving a signal from the server indicative at least in part of the quality of the map.

In some implementations, the method further comprises correcting errors in the map. In some implementations, correcting errors includes machine learning that associates at least one of the errors in the map with at least a portion of a corrected map.

In some implementations, the method further comprises determining not to autonomously navigate at least a portion of the navigable route. In some implementations, determining not to autonomously navigate at least a portion of the navigable route includes determining to avoid an obstacle.

In some implementations, the demonstration comprises receiving control signals from a user. In some implementations, creating the map of a navigable route and surrounding environment further comprises sensing the surrounding environment with a sensor. In some implementations, creating the map of a navigable route and surrounding environment further comprises sensing the surrounding environment with a three-dimensional sensor.

In some implementations, causing the robot to autonomously navigate further comprises receiving a selection of the navigable route from a user interface. In some implementations, causing the robot to autonomously navigate comprises navigating using the map of the navigable route and surrounding environment.

In some implementations, the method further comprises associating the map of the navigable route and surrounding environment with the initialization location.

In some implementations, the method further comprises determining the navigable route based at least in part on the association of the map of the navigable route and surrounding environment to the initialization location.

In some implementations, the method further comprises mapping on the created map an action performed by the robot on the navigable route. In some implementations, the action comprises cleaning a floor. In some implementations, the action comprises turning.

As another example, some implementations include a non-transitory computer-readable storage medium having a plurality of instructions stored thereon, the instructions being executable by a processing apparatus to operate a robot, the instructions configured to, when executed by the processing apparatus, cause the processing apparatus to create a map of a navigable route and surrounding environment during a demonstration of the navigable route to the robot beginning from an initialization location.

In some implementations, the created map further comprises an indication representative at least in part of an action performed by the robot on the navigable route. In some implementations, the action is cleaning a floor. In some implementations, the robot is a floor cleaner. In some implementations, the demonstration of the navigation route is a computer simulation.

As another example, some implementations include a robot comprising: a mapping and localization unit configured to create a map of a navigable route and surrounding environment during a demonstration of the navigable route to the robot beginning from an initialization location; and a navigation unit configured to autonomously navigate the robot using the map.

In some implementations, the navigation unit is further configured to determine not to autonomously navigate at least a portion of the navigable route. In some implementations, the determination not to autonomously navigate includes a determination to avoid an obstacle.

In some implementations, the robot further comprises a sensor unit configured to generate sensor data indicative at least in part of objects within a sensor range of the robot, wherein the navigation unit is further configured to autonomously navigate based at least in part on the generated sensor data.

In some implementations, the robot further comprises a first actuator unit configured to actuate a brush. In some implementations, the robot further comprises a second actuator unit configured to turn the robot.

In some implementations, the robot further comprises a processor configured to associate a position on the map with actuation of the first actuator unit. In some implementations, the robot further comprises a processor configured to associate a position on the map with actuation of the second actuator unit.

In some implementations, the robot further comprises a user interface unit configured to receive a selection of a created map from a user, wherein the robot autonomously navigates at least in part on the received selection.

In some implementations, the robot further comprises map evaluation unit configured to correct errors in the map. In some implementations, the correction of errors includes machine learning that associates at least one of the errors in the map with at least a portion of a corrected map.

In some implementations, the errors include at least overlapping objects. In some implementations, the errors include failure to form a closed loop. In some implementations, the errors include predetermined patterns in the map.

In some implementations, the map evaluation unit is further configured to correct errors in the map. In some implementations, the correction of errors includes machine learning that associates at least one of the errors in the map with at least a portion of a corrected map.

In some implementations, the processor is further configured to associate the map of the navigable route and surrounding environment with the initialization location.

In some implementations, the processor is further configured to determine the navigable route based at least in part on the association of the map of the navigable route and surrounding environment to the initialization location. In some implementations, the navigation unit is further configured the causation of the robot to autonomously navigate further comprises instructions configured to cause the processing apparatus to navigate based at least in part on the created map.

In some implementations, the robot further comprises a communication unit configured to communicate with a server, wherein the robot sends the map to the server and receives a verification of the quality of the map.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5E is an overhead view of an exemplary robot, where robot emits an energy pattern in accordance with the principles of the present disclosure.

Figure 1A:
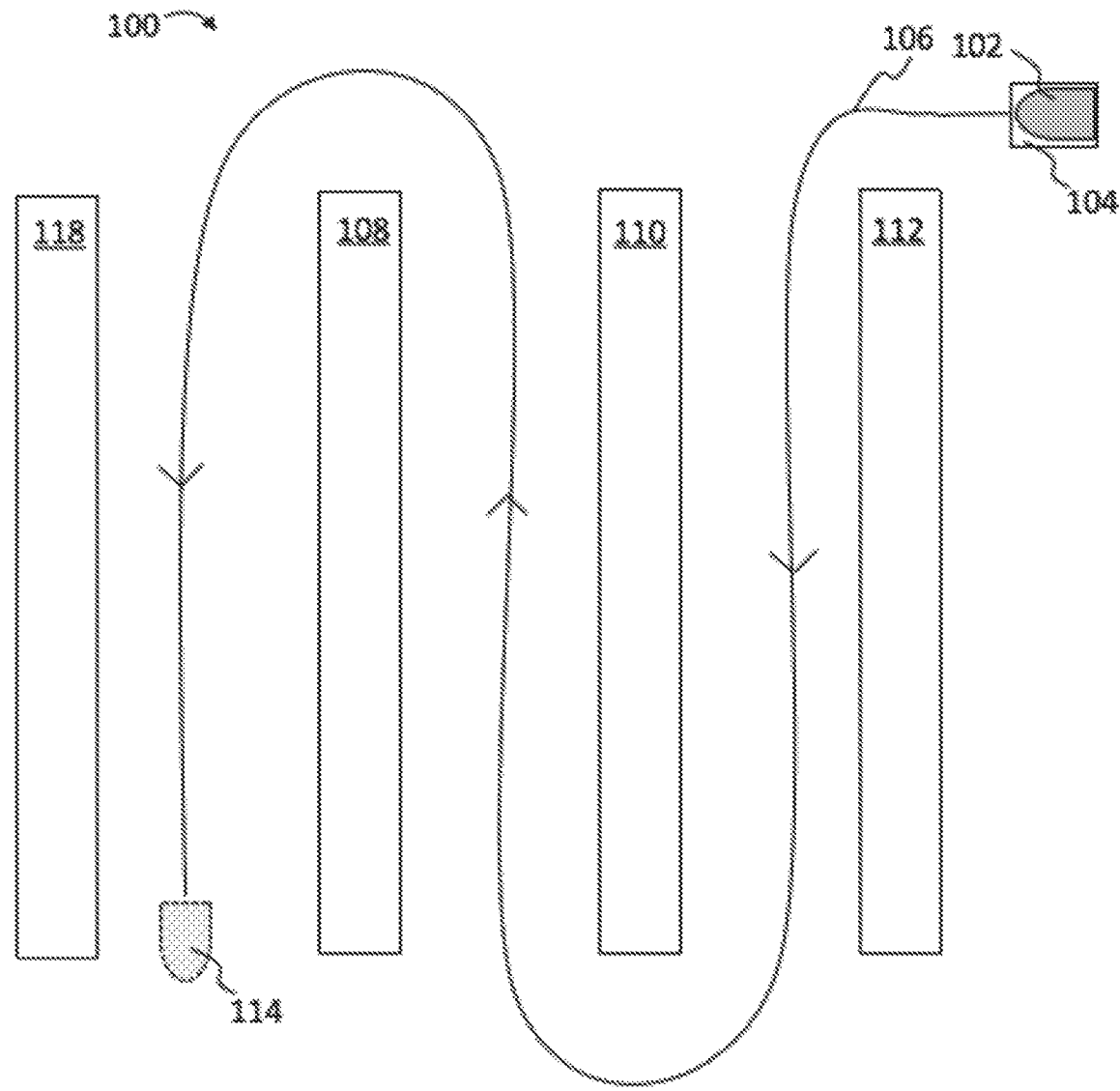
FIG. 1A is an overhead view of one example route autonomously navigated by a robot in accordance with implementations of the present disclosure.

All Figures disclosed herein are © Copyright 2016 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect disclosed herein can be implemented by one or more elements of a claim.

Although particular implementations are described herein, many variations and permutations of these implementations fall within the scope of the disclosure. Although some benefits and advantages of the implementations are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods of operating a robot for autonomous navigation. As used herein, a robot can include mechanical or virtual entities configured to carry out complex series of actions automatically. In some cases, robots can be electro-mechanical machines that are guided by computer programs or electronic circuitry. In some cases, robots can include electro-mechanical machines that are configured for autonomous navigation, where the robot can move from one location to another with little to no user control. Such autonomously navigating robots can include autonomous cars, floor cleaners (e.g., floor scrubbers, vacuums, etc.), rovers, drones, and the like. In some implementations, some of the systems and methods described in this disclosure can be implemented to a virtual environment, where a virtual robot can learn demonstrated routes in a simulated environment (e.g., in a computer simulation) with characteristics of the physical world. After learning those routes, the robot can then autonomously navigate the learned routes in the simulated environment and/or in the real world using systems and methods disclosed in this disclosure.

Detailed descriptions of the various embodiments and variants of the system and methods of the disclosure are now provided. While primarily discussed in the context of robotic floor cleaners, it will be appreciated that the described systems and methods contained herein can be used in other robots including, for example, any autonomously navigating robot. Myriad other exemplary implementations or uses for the technology described herein would be readily envisaged by those of ordinary skill, given the contents of the present disclosure.

Advantageously, the systems and methods of this disclosure at least: (i) reduce or eliminate the need for environment-specific programming; (ii) reduce or eliminate the need for highly skilled technicians to program a robot; (iii) provide application-specific performance from a generally programmed robot; (iv) obviate or reduce the need for task-specific programming (e.g., such as how close to navigate to obstacles for cleaning; and (v) enable effective autonomous navigation of robots. Other advantages are readily discernable by one of ordinary skill given the contents of the present disclosure.

For example, by training robots to travel routes by demonstration, a user does not have to program every route beforehand. Advantageously, this can allow a user to train a robot to navigate environments that the user had not anticipated beforehand. Also, a user may not utilize any particular expertise to train the robot. For example, a user may not have to know computer science and/or be educated on how to program the robot. Instead, a user may just know how to perform the task that he/she desires the robot to do. For example, where the robot is a floor cleaner, the user may just know how to clean the floor, which he/she can demonstrate to the robot.

In some circumstances, training robots to travel routes can allow robots to perform specific tasks to specification without having to identify and program in each of those specifications. By way of illustration, where a robot is a floor scrubbing unit, it may be desirable for the floor scrubbing unit to drive a certain distance from a wall, shelf, etc. A user can demonstrate those distances as it trains the robot and the robot, in some cases, can repeat those distances.

Moreover, training a robot that can learn a navigable route can allow a robot to be specifically programmed to efficiently navigate a particular environment while also being generally programmed to perform in many environments. Advantageously, this allows such robots to have the benefit of both being optimized in particular applications, yet having the ability, and flexibility, to perform in a variety of applications.

In some implementations, map and routes can be verified and/or validated before navigation. This verification and/or validation can prevent accidents and/or situations where a robot may crash into walls and/or obstacles because of a poor quality map and/or route.

FIG. 1A illustrates an overhead view of an example route 106 autonomously navigated by robot 102 through implementations of this disclosure. Robot 102 can autonomously navigate through environment 100, which can comprise various objects 108, 110, 112, 118. Robot 102 can start at an initialization location 104 and end at an end location 114.

By way of illustration, in some implementations robot 102 can be a robotic floor cleaner, such as a robotic floor scrubber, vacuum cleaner, steamer, mop, sweeper, and the like. Environment 100 can be a space having floors that are desired to be cleaned. For example, Environment 100 can be a store, warehouse, office building, home, storage facility, etc. One or more of objects 108, 110, 112, 118 can be shelves, displays, objects, items, people, animals, or any other entity or thing that may be on the floor or otherwise impede the robot's ability to navigate through the environment. Route 106 can be the cleaning path traveled by robot 102. Route 106 can follow a path that weaves between objects 108, 110, 112, 118 as illustrated in example route 106. For example, where objects 108, 110, 112, 118 are shelves in a store, robot 102 can go along the aisles of the store and clean the floors of the aisles. However, other routes are also contemplated, such as, without limitation, weaving back and forth along open floor areas and/or any cleaning path a user would use to clean the floor. Accordingly, one or more of routes 106, 116, 126 illustrated in FIGS. 1A, 1B and 1C, respectively, can appear differently as illustrated and are meant merely as illustrative examples. As illustrated, one example of environment 100 is shown, however, it should be appreciated that environment 100 can take on any number of forms and arrangements (e.g., of any size, configuration, and layout of a room or building) and is not limited by this disclosure.

In route 106, robot 102 can begin at initialization location 104, which can be its starting point, and clean along route 106 until it reaches end location 114, where it can stop cleaning. End location 114 can be designated by a user 604, described with reference to FIG. 6A. In some cases, end location 114 can be the location in route 106 after which robot 102 has cleaned the desired area of floor. In some cases, end location 114 can be the same, or substantially similar, as initialization location 104 so that robot 102 performs substantially a closed loop in cleaning and ends up near its starting point, initialization location 104. In some cases, end location 114 can be a location for storage for robot 102, such as a temporary parking spot, storage room or closet, and the like. In some cases, end location 114 can be the point where user 604 decided to stop cleaning and training robot 102. Robot 102 may or may not clean at every point along route 106. For example, where robot 102 is a robotic floor scrubber, the cleaning system (e.g., water flow, cleaning brushes, etc.) of robot 102 may only be operating in some portions of route 106 and not others and/or in some trajectories (e.g., while moving in a certain direction or in a particular sequence along route 106). Such may be desirable when only some areas of the floor are to be cleaned but not others. In such cases, robot 102 can turn on a cleaning system in areas where user 604 demonstrated for robot 102 to clean, and turn off the cleaning system otherwise.

Figure 1B:
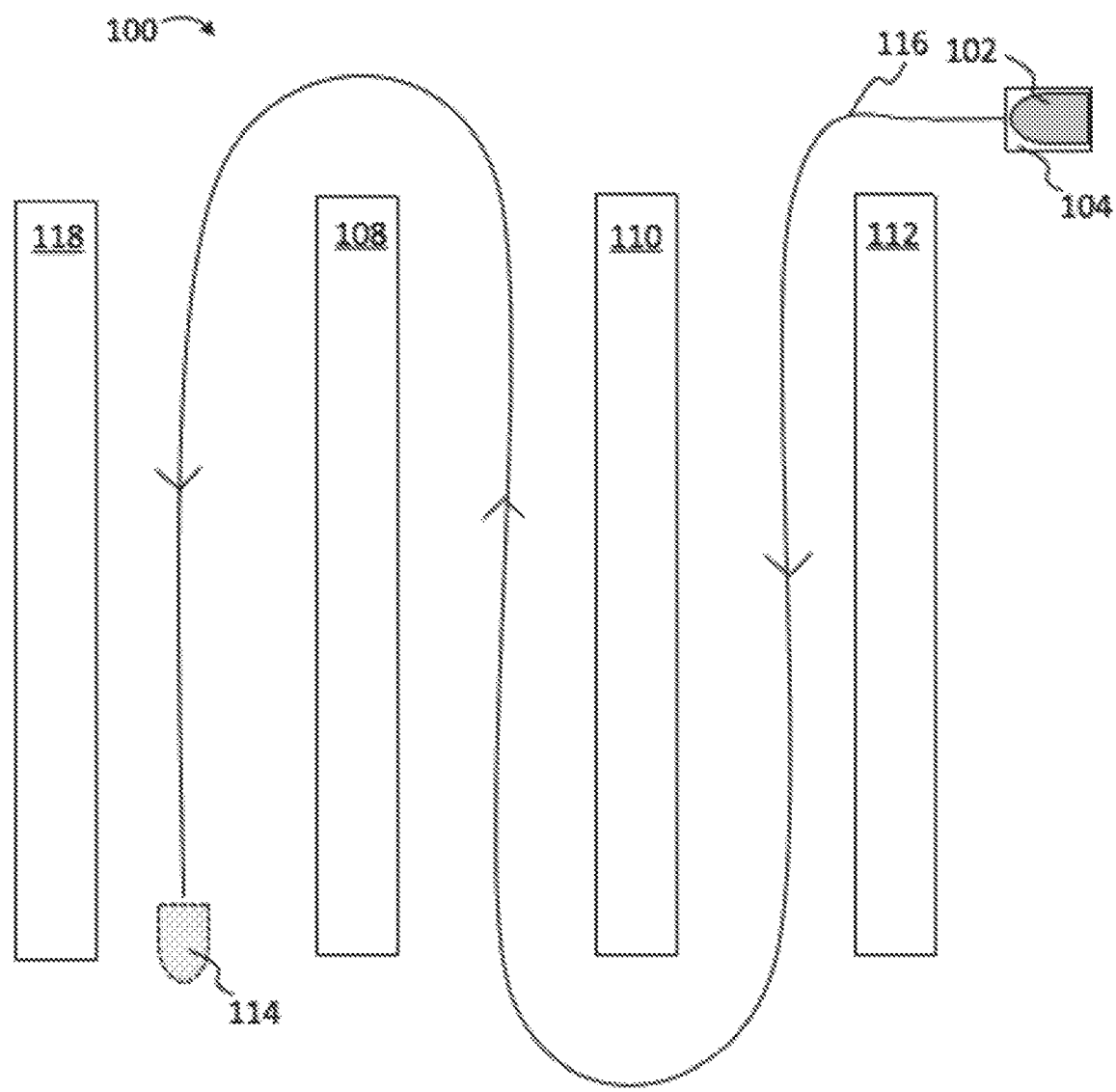
FIG. 1B is an overhead view of the example route illustrated in FIG. 1A illustrating a user demonstrating the route to the robot in accordance with implementations of the present disclosure.
Figure 1C:
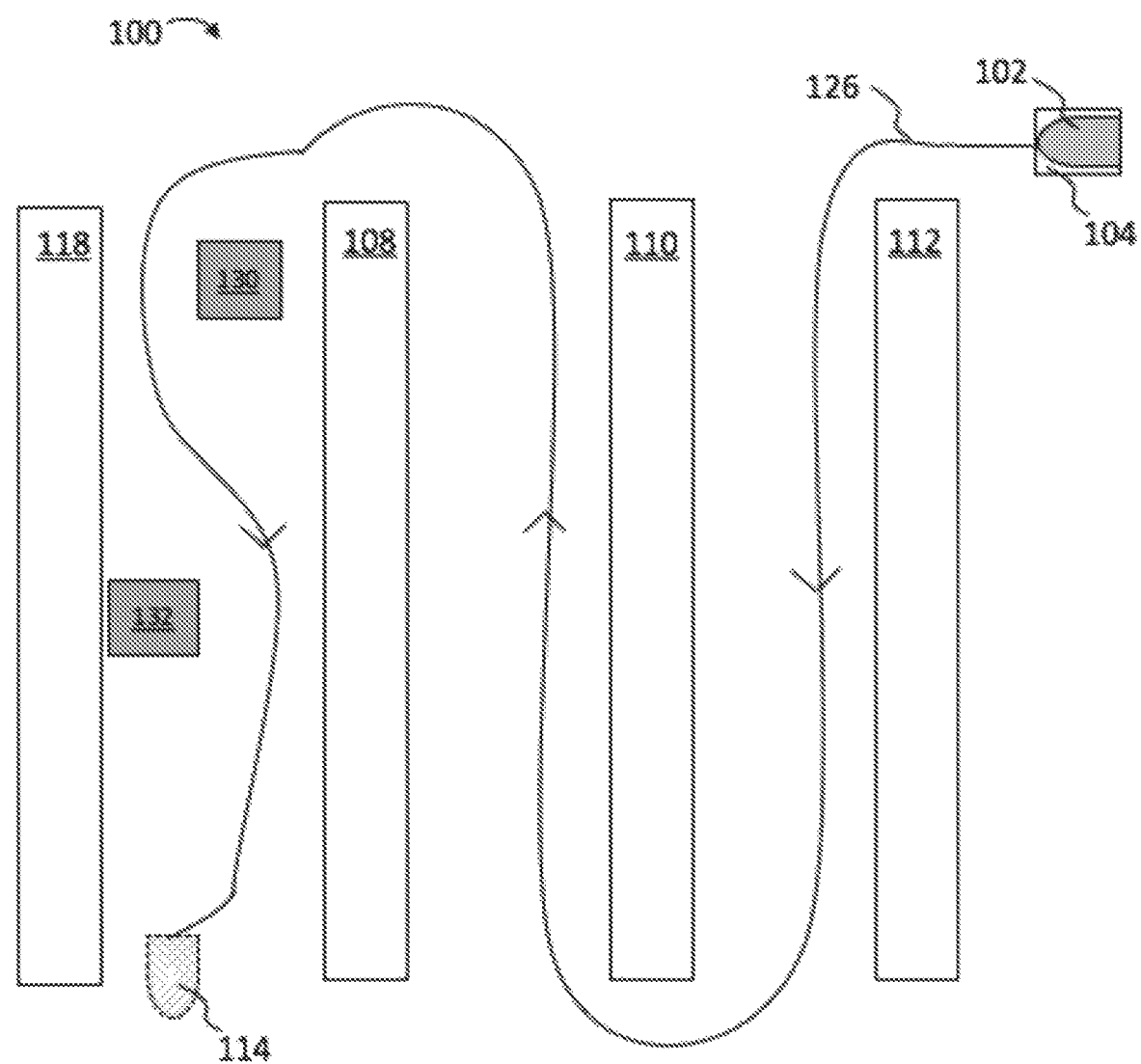
FIG. 1C is an overhead view of an alternative example route autonomously navigated by the robot shown in FIGS. 1A and 1B, where the robot avoids objects in accordance with the principles of the present disclosure.

FIG. 1B illustrates an overhead view of user 604 demonstrating route 116 to robot 102 before robot 102 autonomously travels route 106 in environment 100. In demonstrating route 116, a user can start robot 102 at initialization location 104. Robot 102 can then weave around objects 108, 110, 112, 118. Robot 102 can finally end at end location 114. In some cases, autonomously navigated route 106 can be exactly the same as demonstrated route 116. In some cases, route 106 might not be precisely the same as route 116, but can be substantially similar. For example, as robot 102 navigates route 106, robot 102 uses its sensors (e.g., sensors 560A-D and/or sensors 568A-B as will be described with reference to FIGS. 5B-E) to sense where it is in relationship to its surrounding. Such sensing may be imprecise in some instances, which may cause robot 102 to not navigate the precise route that had been demonstrated and robot 102 had been trained to follow. In some cases, small changes to environment 100, such as the moving of shelves and/or changes in the items on the shelves, can cause robot 102 to deviate from route 116 when it autonomously navigates route 106. As another example, as illustrated in FIG. 1C robot 102 may avoid objects 130, 132 by turning around them when autonomously navigating route 126, which can be another route travelled by robot 102 based at least in part on demonstrated route 116. Objects 130, 132 might not have been present (and avoided) when the user demonstrated route 116. For example, objects 130, 132 may be temporarily placed and/or transient objects/items, and/or transient and/or dynamic changes to the environment 100. As another example, user 604 may have done a poor job demonstrating route 116. For example, user 604 may have crashed and/or bumped into a wall, shelf, object, obstacle, etc. In these cases, robot 102 can store in memory (e.g., memory 302) one or more actions that it can correct, such as crashing and/or bumping to a wall, shelf, object, obstacle, etc. When robot 102 then autonomously navigates demonstrated route 116 as route 126, robot 102 can correct such actions and not perform them (e.g., not crash and/or bump into a wall, shelf, object, obstacle, etc.) when it is autonomously navigating. In this way, robot 102 can determine not to autonomously navigate at least a portion of a navigable route, such as a demonstrated route. In some implementations, determining not to autonomously navigate at least a portion of the navigable route includes determining when to avoid an obstacle and/or object.

As previously mentioned, as a user demonstrates route 116, the user can turn on and off the cleaning system of robot 102, or perform other actions, in order to train robot 102 where (e.g., at what position), and/or along what trajectories, to clean along route 116 (and subsequently when robot 102 autonomously cleans route 106). The robot can record these actions in memory 302 and later perform them when autonomously navigating. These actions can include any actions that robot 102 may perform, such as turning, turning on/off water, spraying water, turning on/off vacuums, moving vacuum hose positions, gesticulating an arm, raising/lowering a lift, moving a sensor, turning on/off a sensor, etc.

Figure 2:
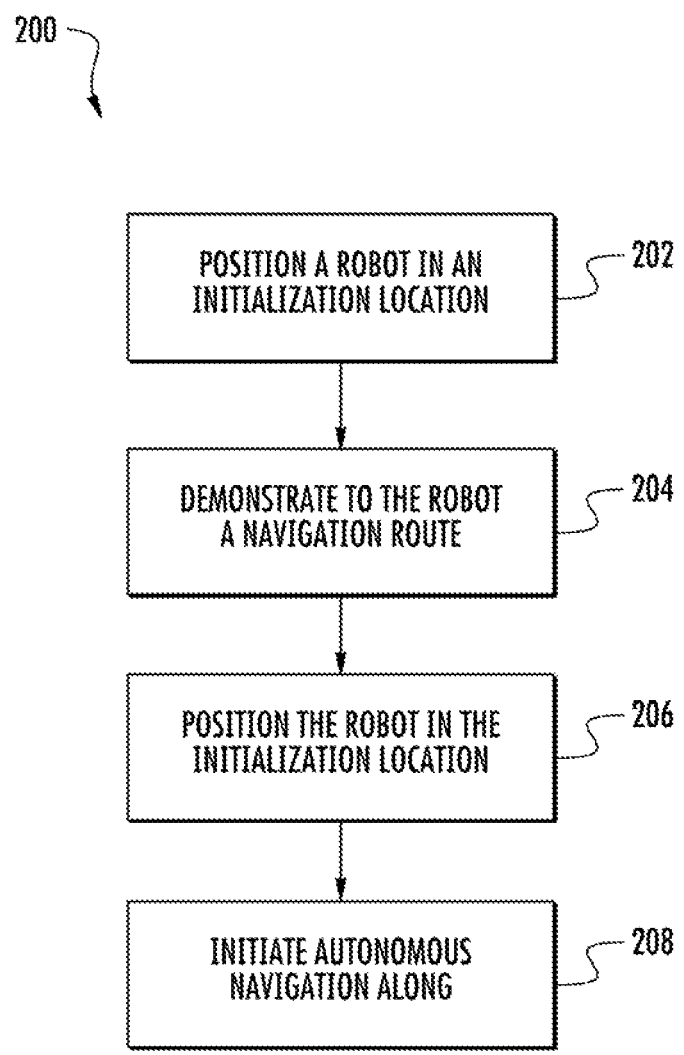
FIG. 2 is a process flow diagram of an exemplary method for training a robot to autonomously navigate an example route in accordance with the principles of the present disclosure.

FIG. 2 illustrates a process flow diagram of an exemplary method 200 for training robot 102 to autonomously navigate route 106. Portion 202 includes positioning robot 102 in initialization location 104. This first placement of robot 102 into initialization location 104 can be performed by a user 604 (later described with reference to FIG. 6), who can be a janitor, custodian, or any other person, who drives, remote controls, pushes, or otherwise controls robot 102 to move it into initialization location 104. For example, user 604 can cause control signals to be sent to robot 102. Robot 102 can receive those control signals as instructions for movement.

Returning back to FIG. 2, portion 204 includes demonstrating navigation route 116 to robot 102. By way of illustration using FIG. 1B, user 604 can demonstrate to robot 102 by, without limitation, driving, remote controlling, pushing, or otherwise controlling robot 102 along route 116. For example, user 604 can cause control signals to be sent to robot 102. Robot 102 can receive those control signals as instructions for movement. A plurality of these movements can, together, form the demonstrated route. In this way, user 604 can demonstrate to robot 102 the desired route for travelling. In the context of robotic floor cleaners, demonstrated route 116 can be the desired route for cleaning the floor. In this way, user 604 trains robot 102 how to clean the floor.

Returning back to FIG. 2, portion 206 includes positioning robot 102 in initialization location 104 once again. This second placement of robot 102 into initialization location 104 can occur at a later point in time after portion 204, such as substantially right after the demonstration of portion 204, or at some later time, such as hours later, days later, weeks later, or whenever the user 604 desires to clean the floor.

Returning back to FIG. 2, portion 208 includes initiating autonomous navigation. In some cases, after a user has initiated autonomous navigation, robot 102 can travel along route 106 (or route 126 in some cases), which can be substantially similar to demonstrated route 116. In some implementations, user 604 can select the demonstrated route on a user interface, as will be described with reference to FIG. 11A. By way of illustration using FIG. 1A, robot 102 can then navigate route 106, or a route substantially similar to route 106, autonomously from initialization location 104 to end location 114.

Figure 3:
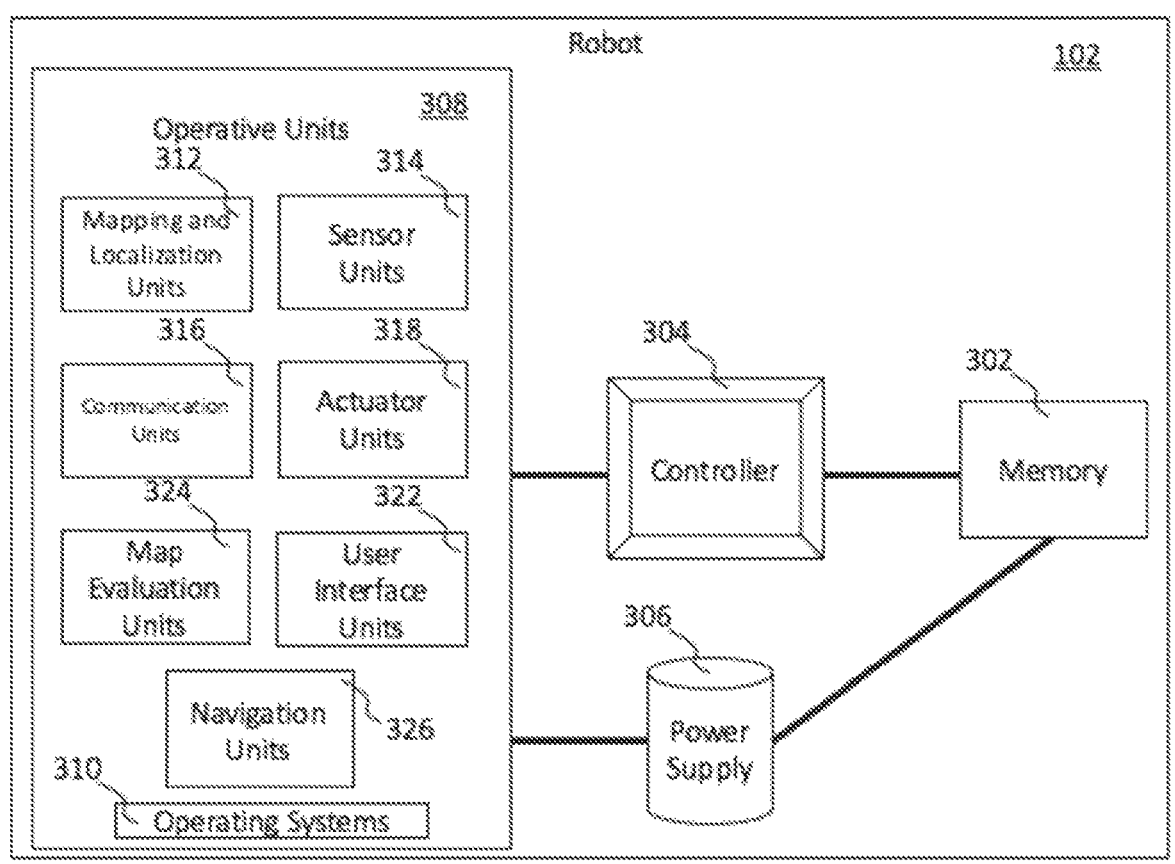
FIG. 3 is a functional block diagram of one exemplary robot in accordance with some implementations of the present disclosure.

FIG. 3 illustrates a functional block diagram of example robot 102 in some implementations. As illustrated in FIG. 3, robot 102 includes controller 304, memory 302, power supply 306, and operative units 308, each of which can be operatively and/or communicatively coupled to each other and each other's components and/or subcomponents. Controller 304 controls the various operations performed by robot 102. Although a specific implementation is illustrated in FIG. 3, it is appreciated that the architecture may be varied in certain implementations as would be readily apparent to one of ordinary skill given the contents of the present disclosure.

Controller 304 can include one or more processors (e.g., microprocessors) and other peripherals. As used herein, the terms processor, microprocessor, and digital processor can include any type of digital processing devices such as, without limitation, digital signal processors ("DPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die, or distributed across multiple components.

Controller 304 can be operatively and/or communicatively coupled to memory 302. Memory 302 can include any type of integrated circuit or other storage device adapted for storing digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output RAM ("EDO"), fast page mode RAM ("FPM"), reduced latency DRAM ("RLDRAM"), static RAM ("SRAM"), "flash" memory (e.g., NAND/NOR), memristor memory, pseudostatic RAM ("PSRAM"), etc. Memory 302 can provide instructions and data to controller 304. For example, memory 302 can be a non-transitory, computer-readable storage medium having a plurality of instructions stored thereon, the instructions being executable by a processing apparatus (e.g., controller 304) to operate robot 102. In some cases, the instructions can be configured to, when executed by the processing apparatus, cause the processing apparatus to perform the various methods, features, and/or functionality described in this disclosure. Accordingly, controller 304 can perform logical and arithmetic operations based on program instructions stored within memory 302.

Operative units 308 can be coupled to controller 304, or any other controller, to perform the various operations described in this disclosure. One or more, or none, of the modules in operative units 308 can be included in some implementations. Throughout this disclosure, reference may be made to various controllers and/or processors. In some implementations, a single controller (e.g., controller 304) can serve as the various controllers and/or processors described. In other implementations, different controllers and/or processors can be used, such as controllers and/or processors used particularly for one or more of operative units 308. Controller 304 can send and/or receive signals, such as power signals, control signals, sensor signals, interrogatory signals, status signals, data signals, electrical signals and/or any other desirable signals, including discrete and analog signals to operative units 308. Controller 304 can coordinate and/or manage operative units 308, and/or set timings (e.g., synchronously or asynchronously), turn on/off, control power budgets, receive/send network instructions and/or updates, update firmware, send interrogatory signals, receive and/or send statuses, and/or perform any operations for running features of robot 102.

Operative units 308 can include various units that perform functions for robot 102. For example, units of operative units 308 can include mapping and localization units 312, sensor units 314, map evaluation units 324, actuator units 318, communication units 316, navigation units 326, and user interface units 322. Operative units 308 can also comprise other units that provide the various functionality of robot 102. In some cases, the units of operative units 308 can be instantiated in software or hardware or both software and hardware. For example, in some cases, units of operative unit 308 can comprise computer-implemented instructions executed by a controller. In some cases, units of operative unit 308 can comprise hardcoded logic. In some cases, units of operative unit 308 can comprise both computer-implemented instructions executed by a controller and hardcoded logic. Where operative units 308 are implemented at least in part in software, operative units 308 can include units/modules of code configured to provide one or more functionalities.

In some implementations, sensor units 314 can comprise systems that can detect characteristics within and/or around robot 102. Sensor units 314 can include sensors that are internal to robot 102 or external, and/or have components that are partially internal and/or partially external. Sensors unit 314 can include exteroceptive sensors such as sonar, lidar, radar, lasers, video cameras, infrared cameras, 3D sensors, 3D cameras, and/or any other sensor known in the art. Sensor units 314 can also include proprioceptive sensors, such as accelerometers, inertial measurement units, odometers, gyroscopes, speedometers, and the like. In some implementations, sensor units 314 can collect raw measurements (e.g., currents, voltages, resistances gate logic, etc.) and/or transformed measurements (e.g., distances, angles, detected points in obstacles, etc.).

In some implementations, mapping and localization units 312 can include systems and methods that can computationally construct and update map 700 (as will be described with reference to FIGS. 7A-7B) of environment 100 (or any other generated map of any environment) as robot 102 navigates environment 100 (or any other environment). Mapping and localization units 312 can both map environment 100 and localize the robot 102 (e.g., find the position) robot 102 in map 700. At the same time, mapping and localization units 312 can record a demonstrated route (e.g., route 116) in map 700 (e.g., mapped route 716). The mapping can be performed by imposing data obtained at least in part by sensor units 314 into a two-dimensional ("2D"), three-dimensional ("3D"), and/or four-dimensional ("4D") map representative at least in part of the environment 100. For example, map 700 can include depictions representative at least in part of obstacles and/or objects detected by robot 102. Map 700 can also record demonstrated routes, such as mapped route 716 as will be described with reference to FIGS. 7A-7B. For example, mapped route 716 can include coordinates (e.g., x and y in a 2D map and x, y, and z in a 3D map) based at least in part on the relative position of robot 102 (e.g., including one or more of location, displacement, and orientation) to a reference, such as initialization location 104. The coordinates can include an orientation (e.g., a displacement angle) of robot 102 at any given point relative to a reference, such as initialization location 104. As used herein, the term position has its ordinary and customary meaning. For example, in some cases, position can include a location in terms of displacement, coordinates, etc. of an object, robot 102, etc. In some cases, position can also include an orientation of an object, robot 102, etc. Accordingly, in some cases, the terms position and pose may be used interchangeably to include one or more of location, displacement, and orientation. Map 700, created through the demonstration process, can record substantially the whole environment that robot 102 sensed in one or more demonstrations/trainings. For this reason, some may call map 700 a global map. In some cases, map 700 can be static in that after the demonstration, map 700 is substantially not updated. In some implementations, map 700 and mapped route 716 can also be generated separately (e.g., by a user using a computer) and uploaded onto robot 102.

Mapping and localization units 312 can also receive sensor data from sensor units 314 to localize (e.g., position) robot 102 in map 700. In some implementations, mapping and localization units 312 can include localization systems and methods that allow robot 102 to localize itself in the coordinates of map 700. Based at least in part on data from sensors 314, mapping and localization unit 312 can infer the position of robot 102 in the coordinates of map 700 of environment 100. The ability to localize robot 102 with coordinates of map 700 can allow robot 102 to navigate environment 100 using map 700 and approximate where robot 102 is on mapped route 716.

In some implementations, communication units 316 can include one or more receivers, transmitters, and/or transceivers. Communication units 316 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), global system for mobile communications ("GSM"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communication units 316 can also be configured to send/receive a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communication units 316 to communicate to external systems, such as computers, smart phones, tablets, data capture systems, mobile telecommunications networks, clouds, servers, or the like. Communication units 316 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communication 316 can be configured to send and receive statuses, commands, and other data/information. For example, communication units 316 can communicate with a user controller to allow the user to control robot 102. Communication units 316 can communicate with a server/network in order to allow robot 102 to send data, statuses, commands, and other communications to the server. The server can also be communicatively coupled to computer(s) and/or device(s) that can be used to monitor and/or control robot 102 remotely. Communication units 316 can also receive updates (e.g., firmware or data updates), data, statuses, commands, and other communications from a server for robot 102 and/or its operative units 308.

In some implementations, actuator units 318 can include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators can actuate wheels or other displacement enabling drivers (e.g., mechanical legs, jet engines, propellers, hydraulics, etc.) for robot 102 to navigate through environment 100 or any other environment. In some cases, actuators units 318 can include actuators configured for actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 314, and/or any movement desired for robot 102 to perform an action.

In some implementations, user interface units 322 can be configured to enable a user (e.g., user 604 or any other user) to interact with robot 102. For example, user interface units 322 can include touch panels, buttons, keypads/keyboards, ports (e.g., USB, DVI, Display Port, E-Sata, Firewire, PS/2, Serial, VGA, SCSI, audioport, HDMI, PCMCIA ports, memory card ports (e.g., SD and miniSD), and/or ports for computer-readable media), mice, rollerballs, consoles, vibrators, audio transducers, and/or any interface for a user to input and/or receive data and/or commands, whether coupled wirelessly or through wires (including, without limitation, any of the wireless or wired connections described in this disclosure, such as with reference to communication units 316). User interface units 322 can include a display, such as, without limitation, LCDs, LED displays, LED LCD displays, IPSs, cathode ray tubes, plasma displays, HD panels, 4K displays, retina displays, organic LED displays, touchscreens, surfaces, canvases, and/or any displays, televisions, monitors, panels, and/or devices known in the art for visual presentation. In some implementations user interface units 322 can be positioned on the body of robot 102. In some implementations, user interface units 322 can be positioned away from the body of robot 102, but can be communicatively coupled to robot 102 (e.g., via communication units 316) directly or indirectly (e.g., through a network or a cloud).

In some implementations, map evaluation units 324 can include comparators, signal processors, image processors, and other software or hardware components. As will be described with reference to FIGS. 7A-7B, 8A-8C, 9A-9C, 10, 11 map evaluation units 324 can analyze and evaluate map 700 (or any other map) to detect mapping errors, determine the quality of map 700 (e.g., high, good, acceptable, poor, and/or any other designation), and/or the usability of map 700 for autonomous navigation. In some cases, in analyzing the quality of map 700 or any other map, map evaluation units 324 can determine that there has been a mapping error and/or that the map is of poor quality. Consequently, robot 102 can prompt a user (e.g., user 604) using user interface units 322 or through communication units 316 to re-demonstrate a route (e.g., route 116), or otherwise re-map environment 100.

In some implementations, navigation units 326 can include components and/or software configured to provide directional instructions for robot 102 to navigate. Navigation units 326 can process maps and localization information generated by mapping and localization units 312, sensor data from sensor units 314, and/or other operative units 308. For example, navigation units 326 can receive map 700 from mapping and localization units 312. Navigation units 326 can also receive localization information from mapping and localization units 312, which can be indicative at least in part of the location of robot 102 within map 700, including route 716. Navigation units 326 can also receive sensor data from sensor units 314 which can be indicative at least in part of objects around robot 102. Using one or more of the map, location, and sensor data, navigation units 326 can instruct robot 102 where to navigate (e.g., go forward, left, right, back, etc.).

In some implementations, power supply 306 can include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries can be rechargeable, such as wirelessly (e.g., by a resonant circuit and/or a resonant tank circuit) and/or by plugging into an external power source. Power supply 306 can also be any supplier of energy, including wall sockets and electronic devices that convert solar, wind, water, nuclear, hydrogen, gasoline, natural gas, fossil fuels, mechanical energy, steam, and/or any power source into electricity.

In some implementations, operating system 310 can be configured to manage memory 302, controller 304, power supply 306, modules in operative units 308, and/or any software, hardware and/or features of robot 102. For example, and without limitation, operating system 310 can include device drivers to manage hardware resources for robot 102.

As previously mentioned, any of the aforementioned components of robot 102 can be instantiated in software and/or hardware. For example, a unit/module can be a piece of hardware and/or a piece of code run on a computer.

Figure 4:
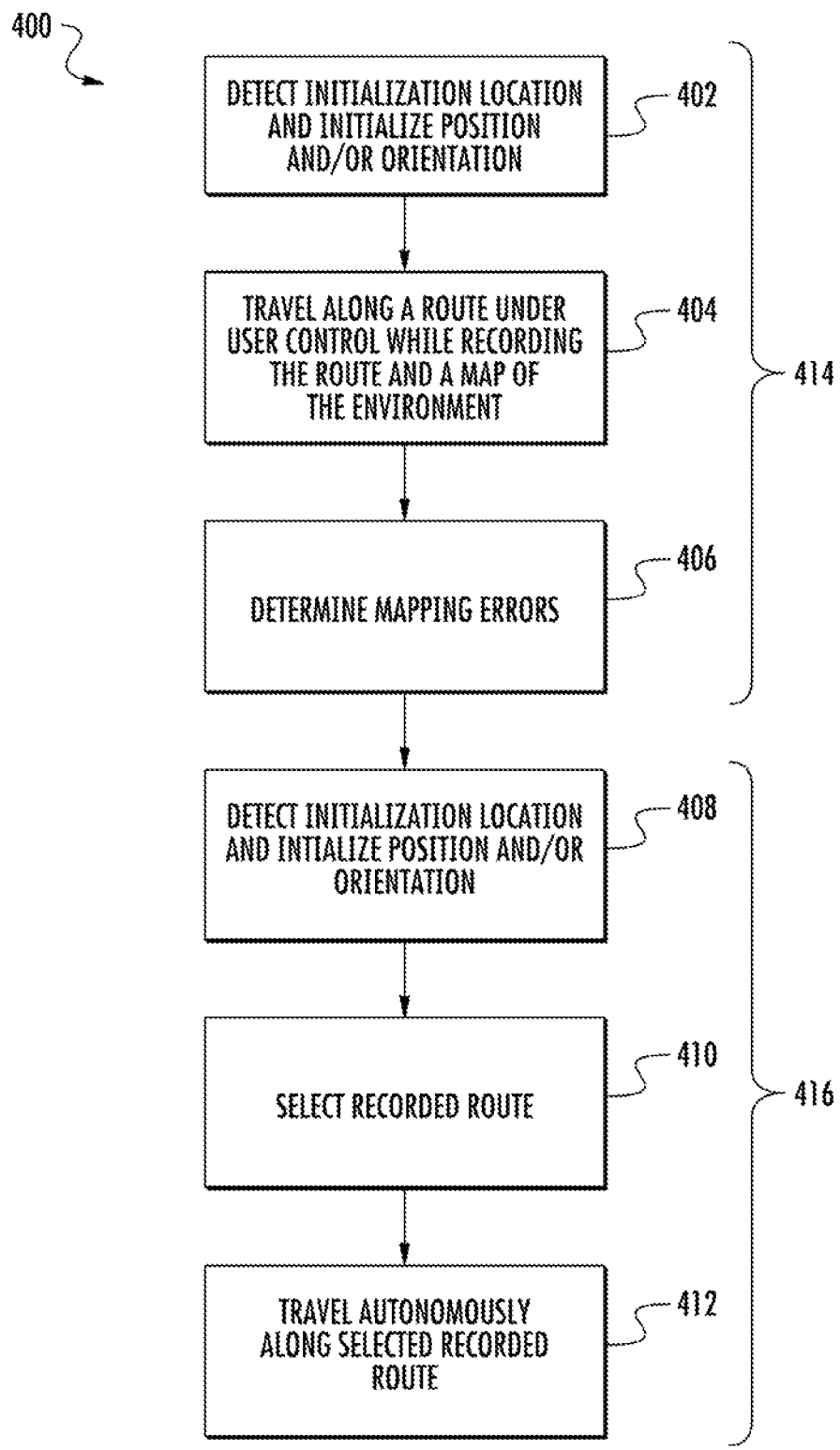
FIG. 4 is a process flow diagram of an exemplary method in which an exemplary robot learns and then travels an example route in accordance with the principles of the present disclosure.

FIG. 4 illustrates a process flow diagram of an exemplary method 400 where robot 102 learns a route and then travels that route. For example, in portions 402, 404, 406 in teaching phase 414, robot 102 can learn route 116 demonstrated by user 604. Subsequently, in portions 408, 410, 412 in autonomous phase 416, robot 102 can autonomously navigate along route 106 or route 126.

Figure 5A:
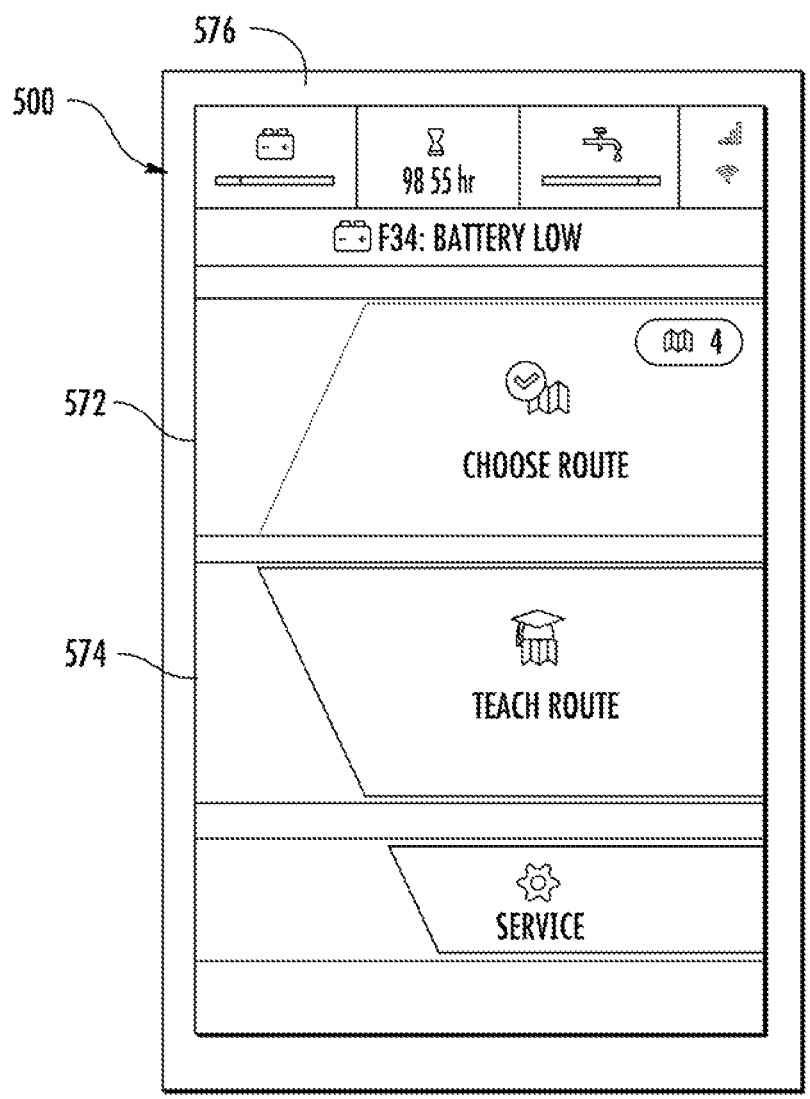
FIG. 5A is one exemplary user interface for receiving an input from a user in order to begin teaching or choosing an example route in accordance with the principles of the present disclosure.

In some implementations, robot 102 can begin teaching phase 414 by receiving an input from input 574 in user interface 500 illustrated in FIG. 5A. User interface 500 can appear on display 576, which can be a mobile device, specialized device, or any other device with a screen and configured to accept a user input. In some cases, display 576 can be part of user interface units 322 of robot 102. In some cases, display 576 can be a separate display communicatively coupled to robot 102, such as, without limitation, communicatively coupled through communication units 316 of robot 102. Input 574 can include buttons, radio buttons, pull-down menus, text input, and/or any way for a user to put in information and/or commands known in the art. User interface 500 can also include input 572, which can be used to initiate autonomous phase 416, which will be described later in this disclosure. Input 572 can include buttons, radio buttons, pull-down menus, text input, or any way for a user to input information and/or commands known in the art.

Returning to FIG. 4, in portion 402, robot 102 can detect initialization location 104 and initialize position and/or orientation of robot 102. In some implementations, initialization location 104 is a position relative to the floor and/or floor plan. For example, initialization location 104 can be demarcated by a user (e.g., drawn and/or marked physically or digitally) so that robot 102 can use the initialization position of the route training for later route initialization (e.g., in recalling learned routes). In some implementations, robot 102 can detect that robot 102 is in initialization location 104 based at least in part on where the user stopped robot 102. As such, it can assume where the user stopped, and subsequently begin training robot 102 (as will be described with reference to portion 404) is initialization location 104. In some implementations, there can be a transmitter (e.g., a transmitter that transmits communications using RFID, NFC, BLUETOOTH®, radio transmission, radio frequency field, and/or any other communication protocol described in this disclosure) at, or substantially close to, initialization location 104. When robot 102 detects that it is on top of, or substantially close to the transmitter, robot 102 can detect that robot 102 is in initialization location 104. In some cases, the transmitter can have an operable range such that robot 102 can detect a communication from the transmitter only when it is in the starting location. By way of illustrative example, the transmission range of NFC can be ten centimeters or less. Accordingly, when robot 102 receives a transmission via NFC, robot 102 can detect that it is positioned in initialization location 104. In some implementations, robot 102 can receive the transmission from the transmitter and calculate the distance to the transmitter based at least in part on the attenuation of the signal strength. In this way, robot 102 can detect how close it is to the transmitter, and consequently, the position of robot 102 relative to the transmitter and/or initialization location 104. In some implementations, robot 102 can determine its location by triangulating the signal strength of a plurality of transmitters. In some implementations, initialization location 104 can be demarcated by a sign (e.g., markings, symbols, lines, etc.) on the floor. When one or more sensors of robot 102 (e.g., of sensor units 314) detect the sign on the floor, robot 102 can detect that robot 102 is positioned in initialization location 104.

In some implementations, a camera is positioned on the ceiling, wherein the camera can be communicatively coupled (e.g., through communication units 316) to robot 102. In some cases, the camera can be part of sensor units 314. The camera can determine the position/pose of robot 102 through image processing and/or machine learning and communicate the position/pose to robot 102. In some cases, the camera will recognize when robot 102 is in initialization location 104 through image processing and/or machine learning and communicate to robot 102 that robot 102 is in initialization location 104.

In some cases, while user 604 may position robot 102 by a demarcated position on the floor, robot 102 will detect and register initiation location 104 by the relationship of initiation location 104 to surrounding objects. By way of illustrative example, Robot 102 can detect initiation location 104 by detecting with one or more of sensors 560A-560D one or more of surrounding objects 512, 546, 548, 550 as will be discussed with reference to FIGS. 5B-5D. In some implementations, more particularly, robot 102 can detect initialization location 104 by detecting with one or more of sensors 560A-560D one or more positions on one or more surrounding objects 512, 546, 548, 550, such as one or more of points 590, 592, 594, 596, 598, as will be discussed with reference to FIGS. 5B-5D. While in initialization location 104, robot 102 can initialize its orientation and position.

In some implementations, from initialization position 104, robot 102 can detect the presence of robot 102 in initialization position 104 and/or determine robot's 102 relative positioning and/or orientation to one or more surrounding objects. In such implementations, in order to detect robot's 102 presence in initialization position 104 and initialize its orientation and/or position, robot 102 can use, at least in part, its sensors (e.g., sensor unit 314) to sense its surrounding. These sensors can sense characteristics of the surrounding environment, such as objects (e.g., items, walls, etc.), floors, ceilings, persons and things, signs, surfaces, etc. The relative position and/or orientation of sensed objects in its surrounding can allow the robot to get its bearings relative to its initialization location.

Figure 5B:
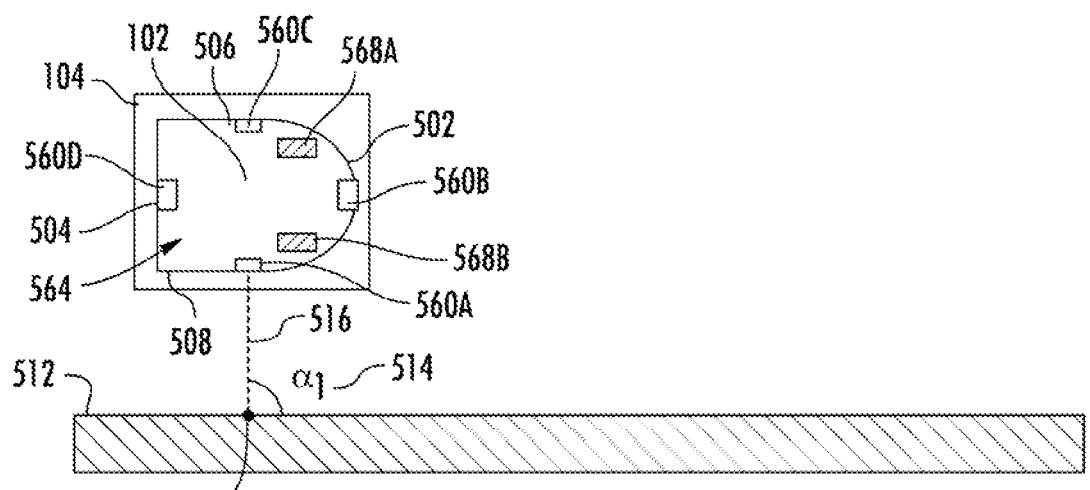
FIGS. 5B-5D are overhead views of an exemplary robot detecting an initialization location and initializing an example orientation and example position in accordance with the principles of the present disclosure.
Figure 5C:
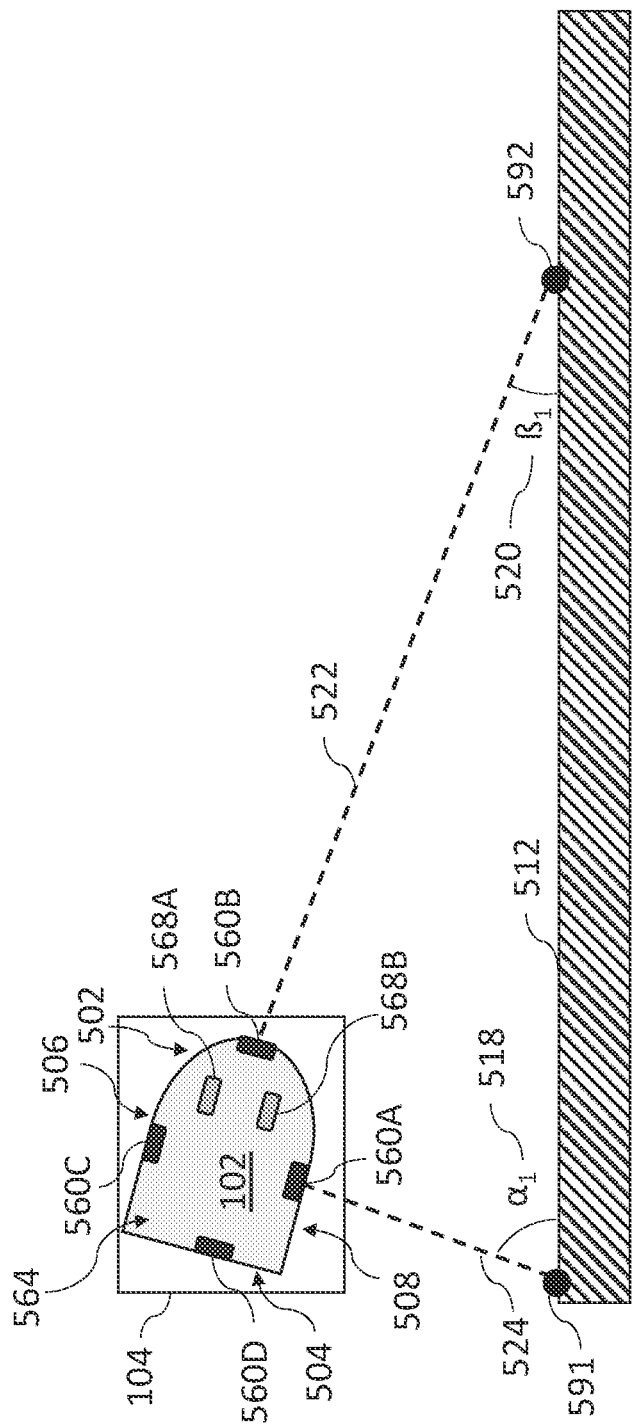
Figure 5D:
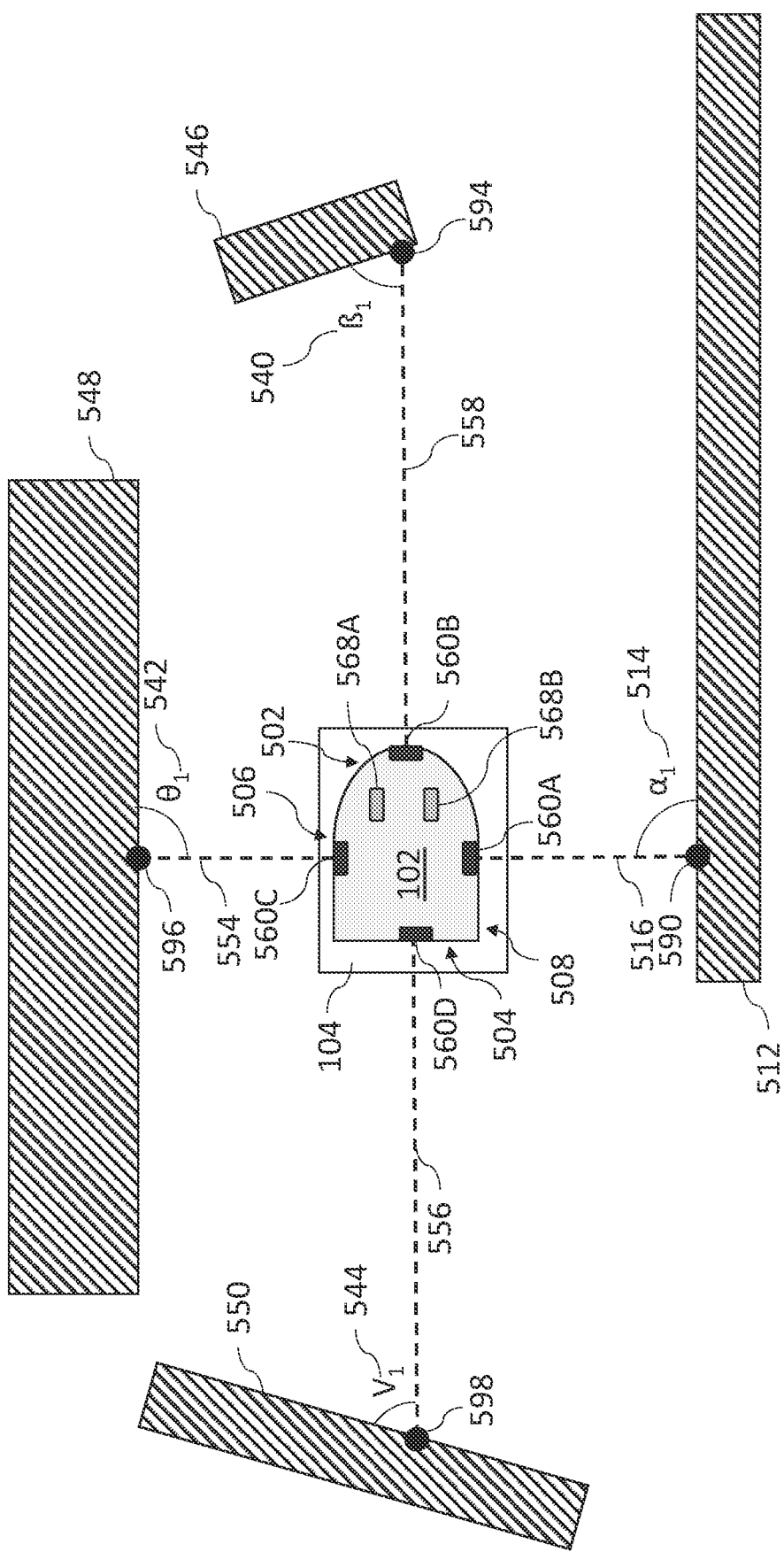

By way of illustrative example, FIGS. 5B-5D illustrate overhead views of example robot 102 in initialization location 104, where robot 102 can detect its presence in initialization location 104 and/or sense its orientation and/or position. As illustrated in FIG. 5B, robot 102 can be positioned in initialization location 104. Robot 102 can include a body with a plurality of sides, such as front side 502, right side 508, left side 506, and back side 504. Robot 102 can also have a top side 564 and a bottom side (not pictured). A person having ordinary skill in the art should appreciate that robot 102 can have other sides as well, corresponding to the surfaces of robot 102, which can vary by shape (e.g., rectangular, pyramidal, humanoid, or any other designed shape). By way of illustration, front side 502 can be positioned on the forward-facing side of robot 102, where the forward-facing side is forward in the direction of forward movement of robot 102. Back side 504 can be positioned on the backward-facing side of robot 102, where the backward-facing side is the side facing in substantially the opposite direction of the forward facing side. Right side 508 can be the right-hand side relative to front side 502, and left side 506 can be the left-hand side relative to front side 502.

Robot 102 can have one or more sensors 560A-560D (which can be part of sensors unit 314 and/or substantially similar to any sensor described in this disclosure) positioned along one or more front side 502, right side 508, left side 506, and/or back side 504. Sensors 560A-560D can comprise exteroceptive sensors. In some cases, each of sensors 560A-560D can include multiple sensors that can detect different characteristics of the surrounding environment 100. Robot 102 can also have one or more sensors 568A-568B, which can include proprioceptive sensors. A person having ordinary skill in the art should appreciate that more sensors can be used and in different positions than as illustrated in FIGS. 5B-5D where different types of sensors and/or different sensor coverage (e.g., sensor positioning to detect a narrower or wider range of environment 100) is desired.

Sensors 560A-560D can be positioned orthogonal to a side (e.g., front side 502, right side 508, left side 506, and back side 504, top side 564, bottom side (not pictured), and/or any other side) or be placed at an angle. The angle can be determined by the desired objects to be sensed and the range, focal plane, region-of-interest, and/or other characteristics of each of sensors 560A-560D. As a non-limiting example, a sonar sensor can emit acoustic signals that fan out in a spread (e.g., a multi-lobed pattern, fan, or other characteristic shape of the sensor) from the sonar sensor. For example, FIG. 5E illustrates an overhead view of robot 102, where robot 102 emits and/or receives energy pattern 580B. Energy pattern 580B is illustrative in nature and not a representation of the actual waveform or transmission of a signal. Instead, energy pattern 580B is indicative of energy emitted and/or later reflected and received in some cases by sensor 560B from front side 502, allowing detection of objects over the spread of energy pattern 580B. Energy pattern 580B can be the characteristic energy used by the type of sensor 560B. For example, where sensor 560B is a lidar, energy pattern 580B can be representative at least in part of the pattern of a plurality of light waves emitted (and later reflected and received in some cases) from sensor 560B. Where sensor 560B is a sonar sensor, energy pattern 580B can be the pattern of sound waves emitted (and later reflected and received in some cases) by sensor 560B. Where sensor 560B is a camera, ambient light or light from a flash of sensor 560B can illuminate objects and sensor 560B can detect the reflected light. As such, in some cases, energy pattern 580B may not represent emitted energy, but rather received energy where no energy is emitted by sensor 560B. Where sensor 560B is an infrared sensor or a 3D camera detecting infrared, energy pattern 580B can be the pattern of infrared light emitted (and later reflected and received) by sensor 560B. In the case of an infrared sensor, sensor 560B can also use filters to see reflected ambient infrared light. As another example, sensor 560B can be a 3D sensor configured to emit and receive energy to sense the environment in three dimensions. A person having ordinary skill in the art should appreciate that other sensors can be used, and energy pattern 580B can represent at least in part the characteristic energy emitted, reflected, and/or received by sensor 560B.

The example sonar sensor can be positioned as one or more of sensors 560A-560D so that the spread covers a desired region or range from robot 102. Measurements (e.g., distance and/or angular measurements) can be taken relative to sensors 560A-560D or relative to another position on the body of robot 102, such as the center of mass of robot 102 or any other designated position.

Returning to FIG. 5B, using the one or more sensors 560A-560D, robot 102 can detect object 512 in its surrounding environment and approximate the position and/or orientation of robot 102 relative to object 512. For example, object 512 can be an obstacle (e.g., items, walls, etc.). From object 512, robot 102 can measure a distance 516 to a point 590 on object 512, which can be an absolute distance measurement using standard units, such as inches, feet, meters, or any other unit of measurement (e.g., measurements in the metric, US, or other system of measurement). In some implementations, distance 516 can be measured in relative (or non-absolute) units, such as ticks, pixels, percentage of range of a sensor, and the like. In some implementations, distance 516 can be expressed in x- and y-coordinates relative to a reference point, such as a point in initialization location 104, object 512, any one of sensor 560A-560D, the center of mass of robot 102, or any other determined location. In such cases, the x-coordinate can be the distance to the reference point relative to a first axis, and the y-coordinate can be the distance to the reference in a second axis, the second axis orthogonal to the first forming a rectangular coordinate system. In some cases, distance 516 can be measured in three dimensions, including the aforementioned x- and y-coordinates, and a z-coordinate, where the z-coordinate can be the distance to the reference point in a third axis.

In some implementations, the one or more sensors 560A-560D can measure or approximate distance 516 to point 590 of object 512. For example, sensor 560A can be a sonar sensor that can measure distance by measuring the time difference of an original emitted sound wave and the reflection of that sound wave back to sensor 560A, where the temporal difference between the emitted and reflected sound waves can be scaled to distance using the speed of sound.

In some implementations, the one or more sensors 560A-560D can create a map 700, as will later be described, where map 700 includes object 512 as well as, in some implementations, a learned route. Distance 516 can be approximated based at least in part on approximate measurements taken on map 700, such as by using relative units on map 700 or scaling the relative units of the map 700 to absolute distance measurements.

Robot 102 can also approximate its orientation in initialization location 104. In some implementations, robot 102 can approximate the relative angle 514 to a reference point such as relative to a point in initialization location 104, object 512, sensors 560A-560D, the center of mass of robot 102, or any other determined location. Angle 514 can be measured in degrees, radians, or any unit. In some implementations, angle 514 can be measured relative to a 2D plane, such as a horizontal plane (e.g., the aforementioned rectangular coordinate system of distance 516 or other measurements). In some implementations, additional angles can be measured, such as one or more of roll, yaw, and, pitch of object 512 relative to robot 102.

By way of illustrative example, robot 102 can measure angle 514 relative to object 512. Similar to how it can approximate distance 516 to object 512, one or more sensors 560A-560D can approximate angle 514 to object 512. For example, sensor 560A can be a sonar sensor that can determine the orientation (e.g., angle 514) of an object 512 relative to sensor 560A based on the angle of received reflected energy. As previously mentioned, in some implementations, one or more sensors 560A-560D can create map 700, which can include object 512. Angle 514 can be approximated based at least in part on approximate measurements taken on the map 700, such as by using relative units on map 700 or scaling those relative units to measured distances.

In some implementations, robot 102 can record its position and/or orientation (e.g., distance 516 and/or angle 514) relative to object 512, and/or point 590 therein in memory 302 and associate its position with respect to object 512 and/or point 590 with initialization position 104. In this way, robot 102 can later both detect initialization position 104 and initialize position with respect to object 512 and/or point 590 when subsequently returning to initialization position 104. The detection of initialization position 104 and the initialization of position can be performed by mapping and localization units 312.

FIG. 5C illustrates an overhead view of robot 102 positioned at an angle in initialization location 104. This time, sensor 560A of robot 102 can measure distance 524 at angle 518 to point 591 of object 512 using systems and methods substantially similar to how sensor 560A measured distance 516 and angle 514 described with reference to FIG. 5B. Additionally, FIG. 5C illustrates that a plurality of sensors 560A-560D can independently measure distances and angles to object 512. For example, sensor 560B can measure distance 522 and angle 520 to point 592 of object 512 using systems and methods substantially similar to how sensor 560A of robot 102 measured distance 516 and angle 514 described with reference to FIG. 5B. In this way, robot 102 can detect initialization position 104 and/or initialize the position and/or orientation of robot 102 with respect to object 512. In some implementations, robot 102 can record robot's 102 position and/or orientation (e.g., one or more of distances 516, 522 and angle 514, 520) relative to object 512, and/or points 591, 592 therein, in memory 302 and associate robot's 102 position and/or orientation with respect to object 512 and/or points 591, 592 with initialization position 104. Accordingly, robot 102 can later both detect initialization position 104 and initialize robot's 102 position and/or orientation with respect to object 512 and/or points 591, 592 when subsequently returning to initialization position 104.

FIG. 5D illustrates an overhead view of example robot 102 where a plurality of example objects 512, 546, 548, 550 are used to detect initialization location 104 and/or initialize the orientation and/or position of robot 102. Using systems and methods substantially similar to how sensor 560A of robot 102 measured distance 516 and angle 514 described with reference to FIG. 5B, robot 102 can also measure distance 558 and angle 540 relative to point 594 of object 546, distance 554 and angle 542 relative to point 596 of object 548, and distance 556 and angle 544 relative to point 598 of object 550. In this way, robot 102 can detect initialization position 104 and initialize robot 102's position and/or orientation with respect to one or more of objects 512, 546, 548, 550, and/or points 590, 594, 596, 598 therein. In some implementations, robot 102 can record its position and/or orientation (e.g., distances 516, 558, 554, 556 and/or angles 514, 540, 542, 544) relative to one or more points 590, 594, 596, 598 of objects 512, 546, 548, 550 in memory 302 and associate robot's 102 position and/or orientation with respect to one or more of objects 512, 546, 548, 550, and/or points 590, 594, 596, 598 therein, with initialization position 104. Accordingly, robot 102 can later both detect initialization position 104 and initialize robot's 102 position and/or orientation when subsequently returning to initialization position 104.

Using a plurality of objects 512, 546, 548, 550 to detect initialization location 104 can be advantageous in allowing robot 102 to more precisely locate initialization location 104. Using a plurality of objects 512, 546, 548 can also provide additional uniqueness to initialization location 104, which can aid robot 102 in detecting initialization location 104 and/or reduce the chances that robot 102 mistakes a different location for initialization location 104.

As robot 102 measures distances and angles to objects, as described with reference to FIGS. 5B-5D, robot 102 can initialize exteroceptive sensors 568A-568B. Initialization of sensors 568A-568B can comprise zeroing sensors 568A-568B, setting sensors 568A-568B to an initial value, or storing in memory 302 the current value of sensors 568A-568B. In some implementations, exteroceptive sensors 568A-568B can initialize relative to a reference point. By way of illustrative example, robot 102 can initialize exteroceptive sensors 568A-568B relative to point 590 such that point 590 is treated as the origin (e.g., (0, 0) in a 2D map or (0, 0, 0) in a 3D map). Accordingly, robot 102 can measure distance 516 and angle 514 to point 590 and determine the initial position and/or orientation of robot 102 relative to the origin. This determination can be performed by mapping and localization units 312. In some implementations, using distance 516 and/or angle 514, robot 102 can then determine its coordinates (e.g., (x, y) in a 2D map or (x, y, z) in a 3D map) using trigonometry on the vector (e.g., distance 516 and angle 514). For example, the x-coordinate can be the cosine of angle 514 multiplied by distance 516 in some cases. The y-coordinate can be the sine of angle 514 multiplied by distance 516 in some cases. Another point, such as, without limitation, one of points 591, 592, 594, 596, 598, can similarly be used as the origin, and trigonometry used with the corresponding vector (e.g., distances 516, 518, 522, 558, 554, 556 and/or angles 514, 518, 520, 540, 542, 544) as illustrated and/or described with respect to FIGS. 5B-5D. In some cases, there can be multiple origins so that a plurality of points (e.g., two or more of points 590, 591, 592, 594, 596, 598) can initialize robot 102. Using multiple origins may be desirable to create multiple maps, provide multiple origins from which to choose for computational simplicity, provide a check of sensors in case one or more have an incorrect reading, and other benefits.

Advantageously, sensors 568A-568B can track the movements (e.g., distance traveled and amount of turning) of robot 102 relative to this initialization of sensors 568A-568B using odometry. For example, sensors 568A-568B can include one or more odometers (e.g., wheel encoders (e.g., rotary encoders), visual odometry, compass, Global Positioning System ("GPS"), inertial measurement units ("IMUs"), lidar, 3D cameras (e.g., red, green, blue, depth ("RGB-D") camera), etc.) that can detect the angular turning of robot 102. IMUs can include accelerometers, magnetometers, angular rate sensors, and the like. For example, where sensors 568A includes a lidar, the displacement (and corresponding position) can be determined based on position differences of different images at different times. Where an RGB-D camera is used, scan matching can be used to determine position. Sensors 568A-568B can also include one or more odometers to measure the distance travelled by robot 102.

Figure 6A:
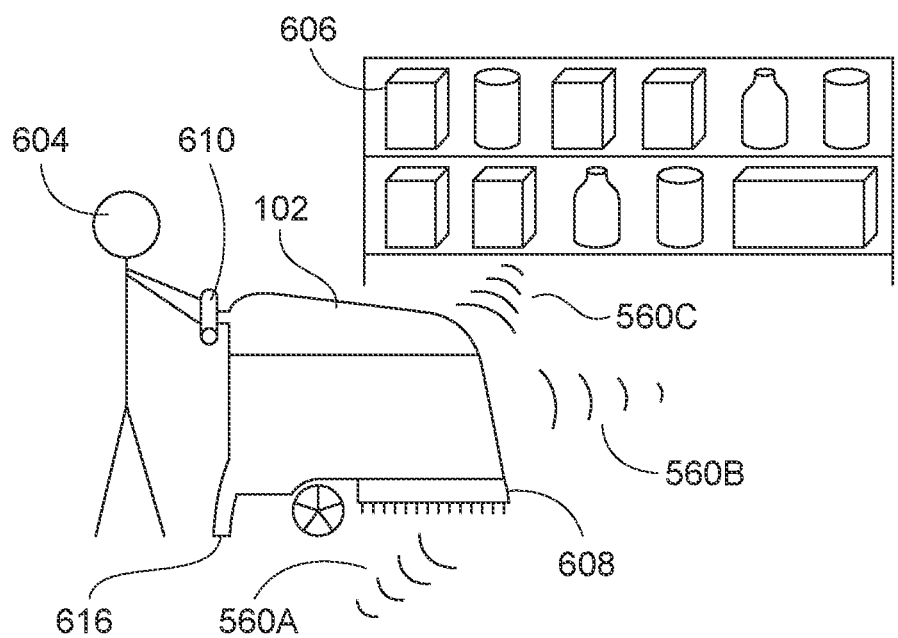
FIG. 6A is a side elevation view illustrating a user controlling a robot while demonstrating an exemplary autonomous navigation route for the robot in accordance with the principles of the present disclosure.

Returning to method 400 of FIG. 4, in portion 404, robot 102 can travel along route 116 (illustrated in FIG. 1B) under user control while recording route 116 and a map 700 of environment 100. FIG. 6A illustrates a side view of example user 604 controlling example robot 102. User 604 can be a janitor, custodian, or any other person who can use robot 102. As illustrated, robot 102 can be a floor cleaner configured to clean the floor of a store, warehouse, office building, home, storage facility, etc. Accordingly, robot 102 can have brush 608 configured to clean the floor beneath and/or around robot 102.

Robot 102 can be trained to associate (e.g., and later perform) an action and/or actuation with a position and/or trajectory on map 700. For example, brush 608 can be actuated by actuator units 318, wherein brush 608 can turn on/off and/or be raised/lowered by actuator units 318. Robot 102 can learn actuations of brush 608 as the user controls brush 608 while recording route 716 and map 700. In some implementations, map 700 can comprise actuator instructions for actuation of brush 608 at one or more positions and/or trajectories on map 700 and/or route 716 therein. In some implementations, robot 102 can also have one or more squeegee 616. Squeegee 616 can be a rubber piece, such as a rubber-edged blade, to clean or scrape the floor. Actuator units 318 can also be used to raise/lower squeegee 616. Accordingly, robot 102 can learn actuations of squeegee 616 as the user controls it while recording route 116 and map 700. In some implementations, map 700 can comprise actuator instructions for actuation of squeegee 616 at one or more locations and/or trajectories on map 700. The actuation of other instruments of a scrubber, or any other robot form, can also be similarly learned, such as turning on/off water, spraying water, turning on/off vacuums, moving vacuum hose positions, gesticulating an arm, raising/lowering a lift, turning a camera and/or any sensor of sensor units 314, and/or any movement desired for robot 102 to perform an action.

In some implementations, where actions and/or actuator instructions are associated with positions on map 700, and/or route 716 therein, while autonomously navigating, robot 102 can perform those actions and/or actuator instructions each time it passes by those positions. In some implementations, where actions and/or actuator instructions are associated with positions and trajectories on map 700, and/or route 716 therein, while autonomously navigating, robot 102 can perform those actions and/or actuator instructions when it is passes by a position in the same direction and/or at the same relative time in a route. Accordingly, in these implementations, robot 102 would not perform those actions and/or actuator instructions each time it passes a position (e.g., where it loops around and passes the same physical location multiple times), but only perform such actions and/or such actuator instructions when it passes by the position (e.g., location) either in a particular direction or at particular instance(s) in the route.

Figure 6B:
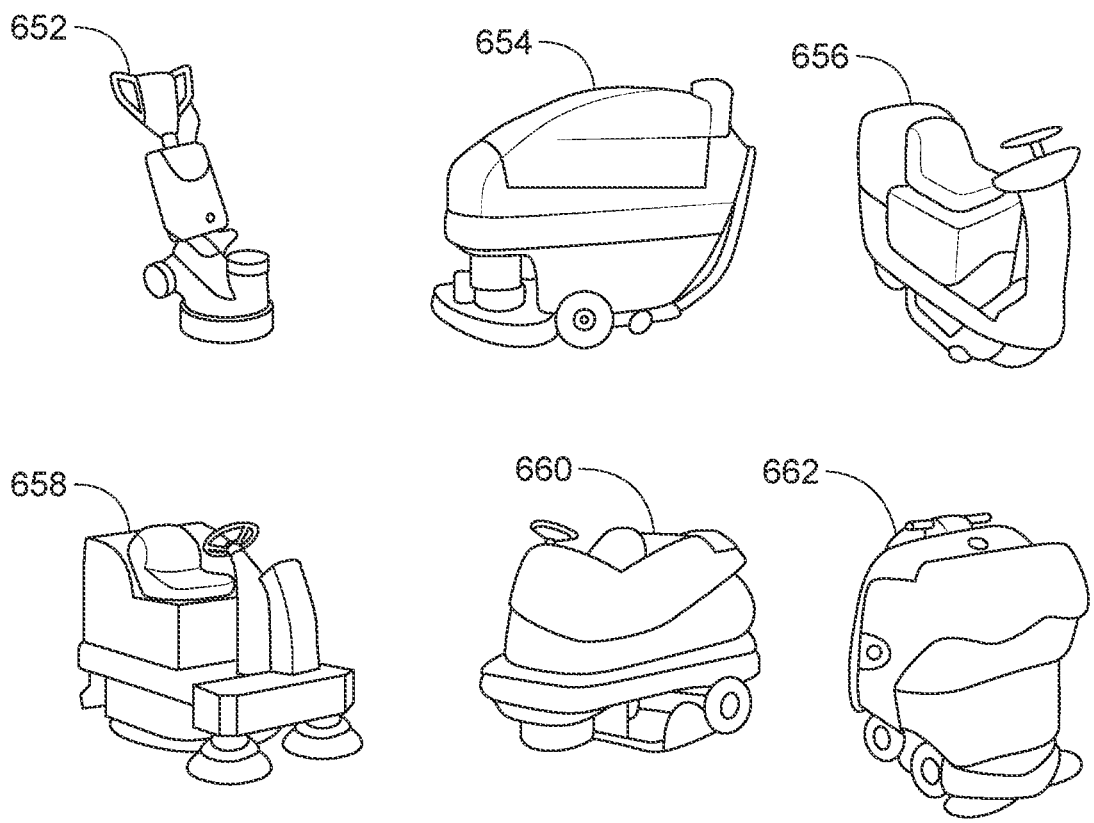
FIG. 6B illustrates various side elevation views of exemplary body forms for a floor scrubber in accordance with the principles of the present disclosure.

A person having ordinary skill in the art should appreciate that robot 102 can have a number of different forms, even if robot 102 is a floor scrubber. FIG. 6B illustrates side views of example body forms for a floor scrubber. These are non-limiting examples meant to further illustrate the variety of body forms, but not to restrict robot 102 to any particular body form or even to a floor scrubber. Example body form 652 has an upright shape with a small frame where a user can push behind body form 652 to clean a floor. In some cases, body form 652 can have motorized propulsion that can assist a user in cleaning, but can also allow for autonomous movement of body form 652. Body form 654 has a larger structural shape than body form 652. Body form 654 can be motorized enabling it to move with little to no user exertion upon body form 654 besides steering. The user may steer body form 654 as it moves. Body form 656 can include a seat, pedals, and a steering wheel, where a user can drive body form 656 like a vehicle as body form 656 cleans. Body form 658 can have a shape that is larger than body form 656 and can have a plurality of brushes. Body form 660 can have a partial or fully encased area where a user sits as he/she drives body form 660. Body form 662 can have a platform where a user stands while he/she drives body form 662.

Figure 6C:
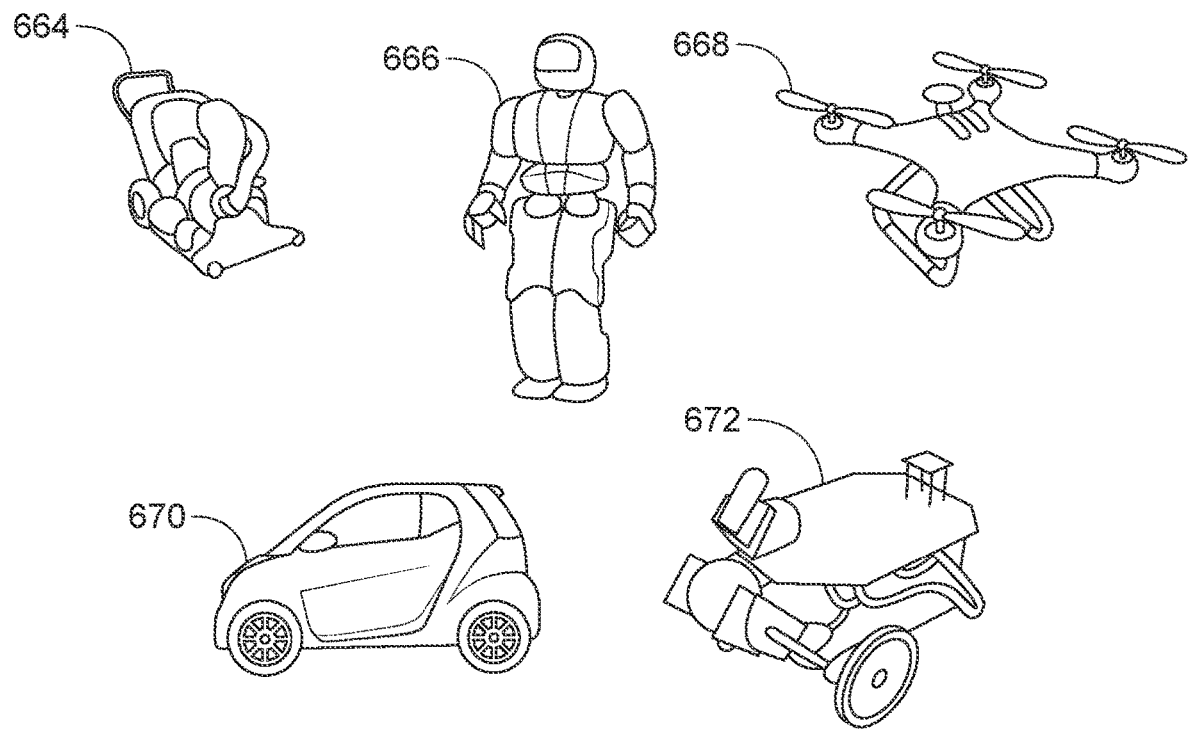
FIG. 6C illustrates various side elevation views of exemplary body forms for a robot in accordance with the principles of the present disclosure.

Further still, as described in this disclosure, robot 102 may not be a floor scrubber at all. For additional illustration, and without limitation, FIG. 6C illustrates some additional examples of body forms of robot 102. For example, body form 664 illustrates an example where robot 102 is a stand-up shop vacuum. Body form 666 illustrates an example where robot 102 is a humanoid robot having an appearance substantially similar to a human body. Body form 668 illustrates an example where robot 102 is a drone having propellers. Body form 670 illustrates an example where robot 102 has a vehicle shape having wheels and a passenger cabin. Body form 672 illustrates an example where robot 102 is a rover.

Returning to FIG. 6A, robot 102 can be configured in any number of ways for control by user 604. As illustrated, user 604 can walk behind robot 102 and steer robot 102 using steering wheel 610. In other implementations, robot 102 can be a ride-on floor cleaner (not pictured) where user 604 can ride on a seat or standing platform of robot 102 and control robot 102. In some implementations, user 604 can control robot 102 remotely with a remote control, such as a radio remote, mobile device, joystick, or any other apparatus for navigation known in the art. This control can include turning left, turning right, moving forward (e.g., using a gas pedal or telling robot 102 to go in a forward direction), moving backwards (e.g., using a reverse pedal or telling robot 102 to go in a backward direction), turn on/off, raise/lower brush, turn on/off water, etc. In some implementations, user 604 may control actuator units 318, which drives movement of robot 102, raises/lowers brushes, turns on/off water, etc. In other implementations, robot 102 may not be a floor cleaner, but may be any of the other robots described in this disclosure.

Figure 6D:
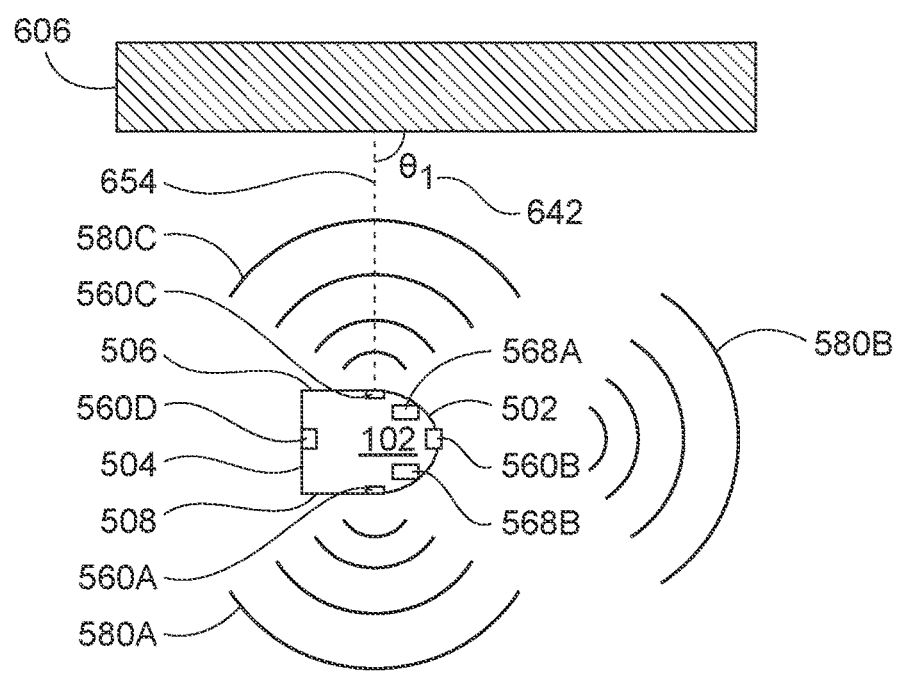
FIG. 6D is an overhead view of a user controlling a robot while the robot senses its surroundings in accordance with the principles of the present disclosure.

FIG. 6D illustrates a top down view as user 604 controls example robot 102, and robot 102 senses its surroundings. Robot 102 can use one or more of sensors 560A-560D and other sensors to detect objects and map the surroundings of robot 102 as robot navigates route 116. For example, robot 102 can emit energy waves 580A-580C. Energy 580B was described earlier in this disclosure with reference to FIG. 5E as well as elsewhere throughout the disclosure. Energy waves 580A, 580C can be substantially similar to energy wave 580B, where energy wave 580A corresponds to sensor 560A and energy wave 580C corresponds to sensor 560C.

Figure 7A:
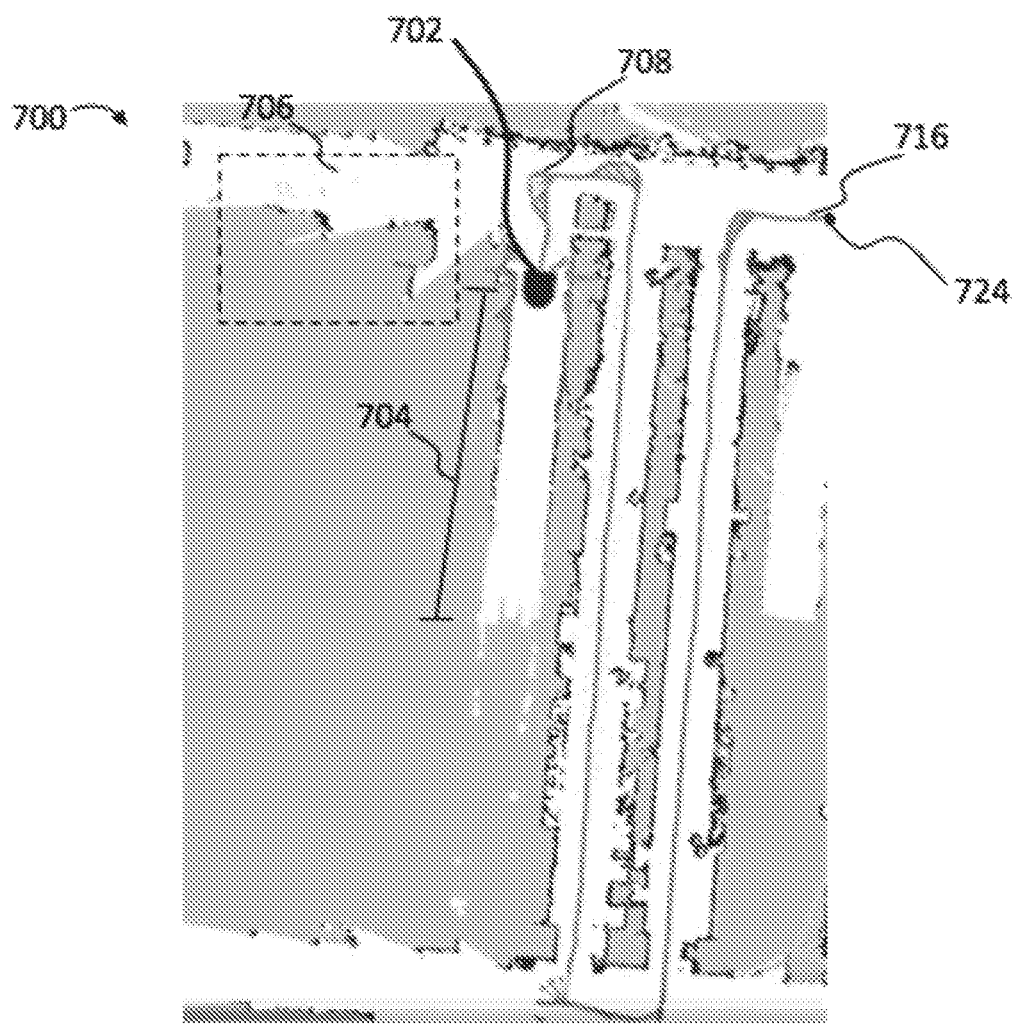
FIGS. 7A-7B illustrate various example maps generated by a robot as it travels in an environment in accordance with the principles of the present disclosure.

FIG. 7A illustrates example map 700 and route 716 generated by example robot 102 as it travels in environment 100. In some implementations, the generation of map 700 can be performed by mapping and localization units 312. Map 700 can comprise pixels, wherein each pixel corresponds to a mapped area of environment 100. The number of pixels in map 700 can be determined based on the resolution of map 700. For example, map 700 can be viewed on screens of varying display size (e.g., 3.5 inch, 10 inch, 20 inch, and/or any other diagonal screen measurement of a screen known in the art) and display resolution (e.g., 800×600, 1024×768, 1360×768, 1680×1050, 1920×1200, 2560×1440, 3840×2160, or any known display resolution known in the art). Screens displaying map 700 can also be rectangular or non-rectangular, including circular, triangular, hexagonal, or any other shape. These screens can be part of user interface units 322. Map 700 can be substantially similar in layout as environment 100, where each pixel in map 700 can approximate a location in environment 100.

In some implementations, pixels of map 700 can have one or more states, where the pixel state is indicative at least in part of a characteristic of the position/location in environment 100 represented by that pixel. For example, pixels of map 700 can be binary, where a first pixel state (e.g., pixel value) is indicative at least in part of a clear (e.g., navigable) location, and a second pixel state is indicative at least in part of a blocked (e.g., not navigable) location. By way of illustration, a pixel value of zero (0) can be indicative at least in part of a clear location and a pixel value of one (1) can be indicative at least in part of a blocked location.

In some implementations, instead of or in addition to the aforementioned binary states, pixels of map 700 can have other pixels states such as one or more of: a pixel state indicative at least in part of an unknown location (e.g., a position/location with no information); a pixel state indicative at least in part of a position/location that should not be traveled to; a pixel state indicative at least in part of being part of a navigable route (e.g., route 716); a pixel state indicative at least in part of an area in which robot 102 has traveled; a pixel state indicative at least in part of an area to which robot 102 has not traveled; a pixel state indicative at least in part of an object; a pixel state indicative at least in part of standing water; and/or any other categorization of a position/location on map 700.

Pixels of map 700 can also store more than a single value, or pixel state. For example, each pixel of map 700 can store a plurality of values such as values stored in a vector or matrix. These values can include values indicative at least in part of the position/pose (e.g., including location and/or orientation) of robot 102 when the position is measured at a point (e.g., pixel) along route 716. These values can also include whether robot 102 should clean or not clean a position/location, or other actions that should be taken by robot 102.

Robot 102 can travel along route 116 (pictured in FIG. 1B), which can be reflected in map 700 as route 716. Robot 102 can be represented by robot indicator 702 on map 700, where the position of robot indicator 702 in map 700 can reflect at least in part the relative location of robot 102 in environment 100. At each location robot 102 travels along route 116, robot 102 can determine its position and/or orientation relative to initialization location 104, or another reference point (e.g., objects 512, 546, 548, 550, points 590, 591, 592, 594, 596, 598, and/or any other reference point robot 102 used during initialization at initialization location 104). These mapping and localization functions can be performed by mapping and localization units 312. Initialization location 104 can be represented on map 700 as mapped position 724. End location 114 can be represented on map 700 as mapped position 726. For example, robot 102 can measure or approximate its distance from initialization location 104 (or another reference point) using odometry, where it uses proprioceptive sensors 568A-568B (e.g., wheel encoders (e.g., rotary encoders), visual odometry, IMUS (including accelerometers, magnetometers, angular rate sensors, and the like), etc.) to track its movements since its initialization at initialization location 104. By way of illustrative example, one or more of proprioceptive sensors 568A-568B can be wheel encoders that measure or estimate distance based on the revolution of the wheels of robot 102. As another illustrative example, visual odometers can be used to measure or estimate the distance travelled and/or orientation of robot 102 through sequential images taken by a camera. The visual odometers can construct an optical flow field (e.g., using Lucas-Kanade methods or other methods) and estimate camera motion, such as by using Kalman filters or projection. As another non-limiting example, IMUS can be used to measure or estimate the position and/or orientation of robot 102.

Robot 102 can record route 716 in map 700, as robot indicator 702 progresses along map 700 in a substantially similar way as robot 102 navigates through environment 100. Advantageously, in some implementations map 700 and route 716 are created together, wherein robot 102 maps the environment 100 and records route 716 at substantially similar times. Accordingly, in some implementations, map 700 and route 716 can be paired together wherein each recorded route is stored only with a particular map.

At each location that is part of route 116, robot 102 can change a corresponding pixel on route 716 in map 700 to a pixel state indicating the pixel is part of a navigable route. At the same time, robot 102 can also measure robot's 102 position and/or orientation relative to objects using one or more sensors 560A-560D using systems and method substantially similar to those described with reference to sensors 560A-560D with respect to FIGS. 5A-5E. In this way, robot 102 can detect and/or measure robot's 102 position and/or orientation relative to objects, such as shelves or walls, in order to populate map 700, where robot 102 can change pixel states based at least in part on these measurements and detections by robot 102.

In the case where robot 102 detects objects, robot 102 can use sensors 560A-560D to detect and/or measure the position and/or orientation of those objects in a plurality of directions relative to robot 102. At the same time, robot 102 can use sensors 568A-568B to estimate robot's 102 position (e.g., distance traveled) and/or orientation. As robot 102 moves in the environment, different objects can come within the range of its sensors. For example, sensor 560B, which can be positioned on front side 502 of robot 102, can have range 704. For example, robot 102 can detect objects at front side 502 up to range 704. Similarly, sensors 560A, 560C, 560D can each have ranges and detect objects within those ranges. As robot 102 detects objects and determines their relative positions and/or orientations from robot 102, robot 102 can indicate on map 700 the location of pixels that correspond to detected objects. Such pixels can be turned to a state that is indicative at least in part that those pixels correspond to objects (e.g., a pixel state indicative of a blocked location or an object).

Because robot 102 populates map 700 on a per pixel basis, map 700 can have certain artifacts. For example, walls that appear smooth can appear jagged based at least in part on the signals received by the sensors. For example, where sensors 560A-560D include sonars, lidars, or other sensors that depend on the reflectance of sound, light, or other elements from surfaces, there can be variability within the surface. There can also be motion artifacts and others artifacts and/or distortions.

In some cases, sensors 560A-560D may not sense certain areas. For example, an object can impede the availability of robot 102 to sense an area, or the area may appear in a blind spot (e.g., place not covered by the measuring range of the sensors). As another non-limiting example, box 706 highlights on the map 700 measurements taken by robot 102 as it made turn 708 on map 700. As robot 102 turned, sensors 560A-560D measured the area marked white (e.g., as navigable locations) by box 706, however, certain objects impeded the range of the sensors, creating the elongated, fractured appearance illustrated in box 706.

Figure 7B:
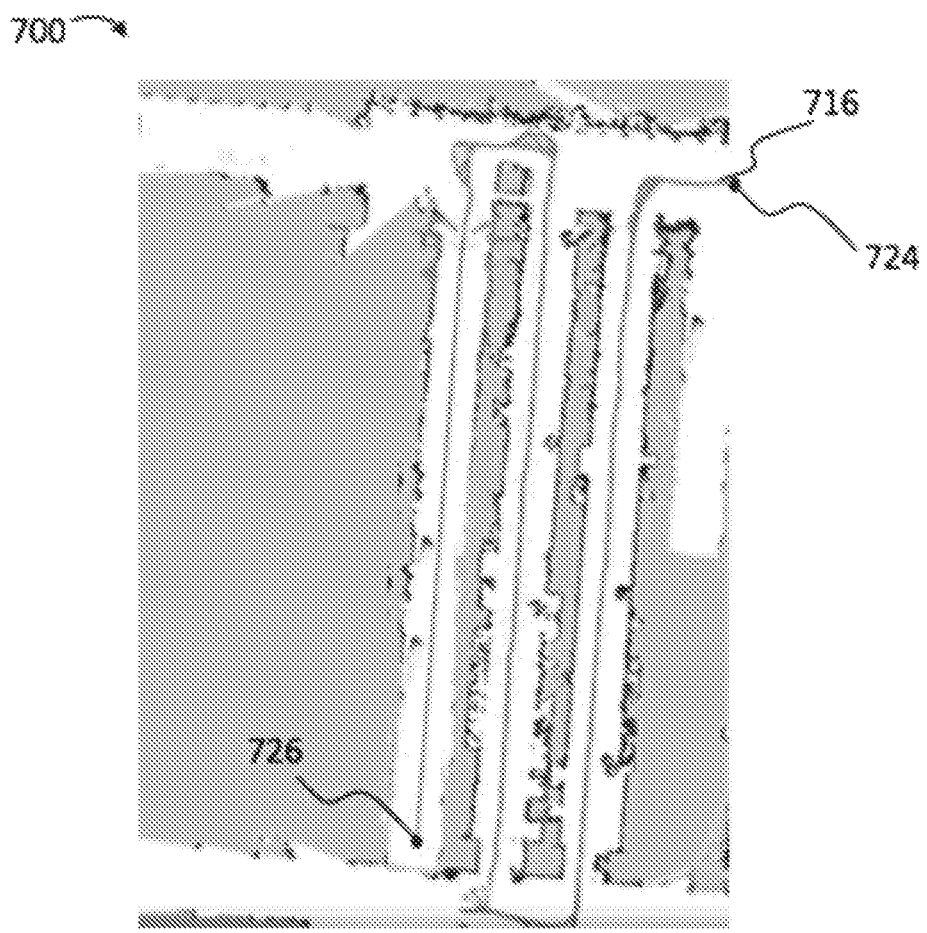

As robot 102 travels along route 116 from initialization location 104 to end location 114, robot 102 can generate map 700 comprising a representation of route 116 and the surrounding environment 100 of route 116 within the range of the sensors of robot 102. FIG. 7B illustrates example map 700 once completed. Advantageously, robot 102 can record mapped route 716 and map the surrounding environment of mapped route 716 in map 700 in one demonstration. Accordingly, map 700 can allow robot 102 to navigate route 116 (or a route substantially similar to route 116) again autonomously in as few as one demonstration.

Other, contemporary systems and methods can demand users upload maps, draw routes on maps, or utilize multiple demonstrations that map the environment. These systems and methods can be burdensome for users. For example, these systems and methods can be cumbersome and provide poor user experiences if the user can even perform all the steps in a satisfactory manner for those systems and methods to work. Having robot 102 record mapped route 716 and map the surrounding environment in map 700 in one demonstration can be advantageous in that it allows a user to train and/or program robot 102 with minimal user interaction. This capability is also advantageous in that it is readily adaptable to many environments based on relatively few user demonstrations.

Returning to FIG. 4, in portion 406, robot 102 can determine mapping errors in map 700. This determination can be performed by map evaluation units 324. Advantageously, where robot 102 desirably travels route 106 autonomously (e.g., in autonomous phase 416) after a single demonstration generating map 700, determining if there have been mapping errors in map 700 (including route 716) can allow robot 102 to avoid, e.g., collisions, errors, and/or any negative consequences of inaccurate or incorrect mapping. If robot 102 finds that there have been sufficient mapping errors in map 700 and/or that map 700 is of poor quality, robot 102 can send (e.g., via user interface units 322) an alert, alarm, prompt and/or other indication to a user (e.g., user 604 or another user) indicating that the map is poor quality. In some cases, robot 102 can send an alert, alarm, prompt or other indication to the user to re-demonstrate a route (e.g., by performing portions 402, 404 again). Advantageously, determining errors and/or evaluating the quality of map 700 prior to autonomous navigation can save time and prevent damage by ensuring that robot 102 does not crash into an obstacle or become stuck due to robot 102's mapping.

There are a number of ways in which robot 102 can detect mapping errors and/or evaluate the quality of map 700 (including route 716), each way implemented alone or in combination. Notably, not every mapping error or the presence of mapping errors, means that map 700 is of poor quality and/or cannot be used to navigate autonomously. Indeed, map 700 can have many errors and still be fit for use for autonomous navigation. Rather, portion 406 can be used to determine if map 700 is sufficiently flawed such that robot 102 cannot or should not navigate autonomously based at least in part on map 700. The foregoing gives some illustrative examples of ways robot 102 can make such an evaluation. In some implementations, in detecting mapping errors and/or evaluating the quality of map 700, robot 102 can take into account at least in part characteristics of errors in map 700. Advantageously, in some cases, robot 102 can detect mapping errors and/or evaluate the quality of map 700 with little or no input and/or effort by user 604. This can create a seamless experience that further emphasizes and reinforces the autonomy of robot 102 to user 604.

As an illustrative example, in some implementations, robot 102 can transmit map 700 to a server, control center, mobile device, and/or any interface for a user/viewer to verify map 700 and/or route 716. The viewer can view map 700 on a display, such as a screen, computer monitor, television, and the like, and/or any display in user interface units 322. The viewer can also communicate back to robot 102, where such communication can be indicative at least in part of whether map 700 and/or route 716 are acceptable for autonomous navigation. In some cases, robot 102 can transmit map 700 using communication units 316, which can send map 700 and receive communications indicative at least in part of whether map 700 and/or route 716 are acceptable to use for autonomous navigation. In some cases, an interface for the user (e.g., user interface units 322) can be on robot 102, wherein the user can view map 700 and/or route 716 and provide an input indicative at least in part of whether map 700 and/or route 716 are acceptable for autonomous navigation.

Figure 8A:
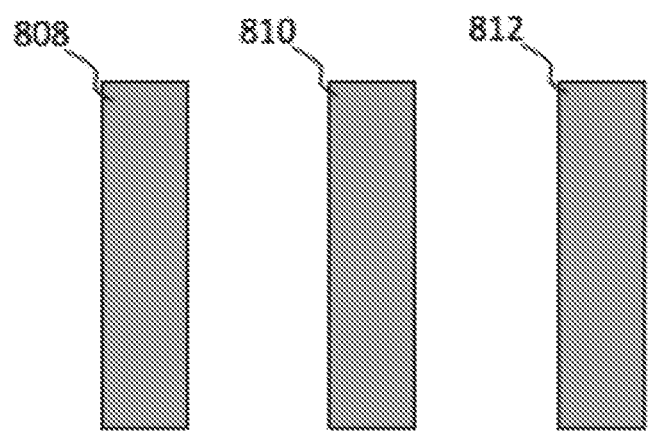
FIGS. 8A-8B illustrate various example mapped objects as they may appear in a map, where FIG. 8A demonstrates one set of example objects that are substantially parallel with one another, while FIG. 8B demonstrates another set of example objects that are not substantially parallel with one another in accordance with the principles of the present disclosure.
Figure 8B:
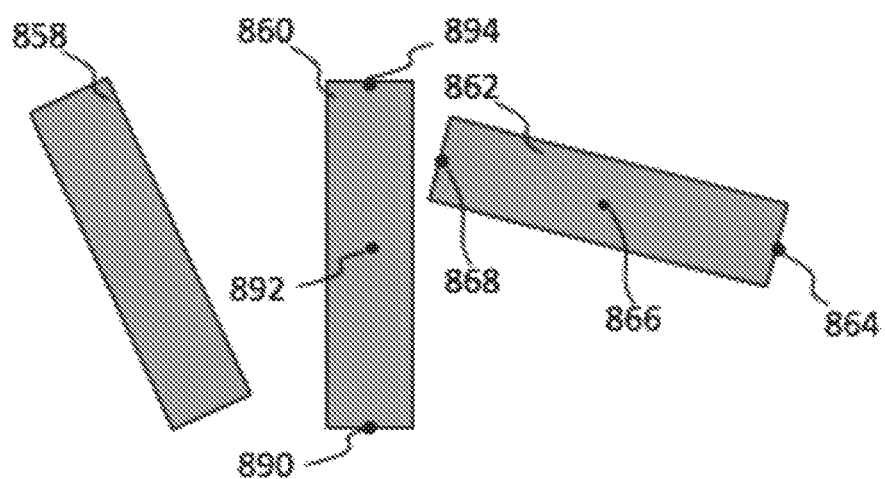

As another illustrative example, in some implementation, robot 102 can look for particular predetermined patterns (e.g., predetermined error patterns) in map 700 including route 716, wherein the presence or absence of particular predetermined patterns can be indicative at least in part of mapping errors and/or the quality of map 700. By way of illustrative example, where robot 102 is a floor cleaner operating in a store, robot 102 can be configured to expect, and/or look for, one or more series of approximately parallel objects 108, 110, 112 (illustrated in FIGS. 1A-1C), which can represent shelves that display goods. As represented in map 700, objects 108, 110, 112 may appear parallel as mapped objects 808, 810, 812, as illustrated in FIG. 8A. Accordingly, where robot 102 instead maps mapped objects 858, 860, 862, as illustrated in FIG. 8B, robot 102 may find that there has been an error in map 700.

Robot 102 can detect such particular patterns on a pixel-by-pixel or region-by-region basis. In some cases, robot 102 can use image processing, such as segmentation, edge detection, shape recognition, and/or other techniques to identify one or more objects 858, 860, 862 in map 700. Once objects 858, 860, 862 are identified, robot 102 can use various methods to determine whether objects 858, 860, 862 are approximately parallel to others of objects 858, 860, 862. Robot 102 can then measure the orientations and/or positions of objects 858, 860, 862, such as the distances and/or relative angles between objects 858, 860, 852. Based at least in part on the measured orientations and/or positions, robot 102 can determine if objects 858, 860, 862 are approximately parallel or not.

By way of illustrative example, robot 102 can use seeding or region growing to define (e.g., find the pixels corresponding to) objects 858, 860, 862. With these pixels, robot 102 can then identify a plurality of points within objects 858, 860, 862. By way of illustrative example, robot 102 can identify points 868, 866, 864 in object 862 and points 890, 892, 894 in object 860. Robot 102 can measure the distance between each of points 864, 866, 868 of object 862 and points 890, 892, 894 of object 860, and compare those distances to determine, at least in part, if objects 860, 862 are approximately parallel. For example, if the difference of the distances between point 866 and point 892, and point 868 and point 894 are above a predetermined threshold (e.g., a threshold indicative of possible deviations in measurements or in the actual location of approximately parallel shelves, such as, without limitation a 5%, 10%, 15% difference), robot 102 can find that objects 860, 862 are not approximately parallel. In some cases, the predetermined threshold can be stored in memory 302. If the difference in the distances is below the predetermined threshold, or equal to it, robot 102 can find that they are approximately parallel. A person having ordinary skill in the art should appreciate that robot 102 can use others of points 864, 866, 868, 890, 892, 894, and/or other points in objects 860, 862 to make similar computations of distances and the difference between distances. Robot 102 can make similar comparisons between each or any of objects 858, 860, 862, and/or any other objects that there may be. Where robot 102 finds one or more substantially not parallel objects, where the expectation was parallel objects such as objects 108, 110, 112, 118, robot 102 can detect mapping errors in map 700 and/or find that map 700 is not of good quality. In some cases, robot 102 can then prompt (e.g., via user interface units 322) the user 604 to demonstrate the route again.

Figure 8C:
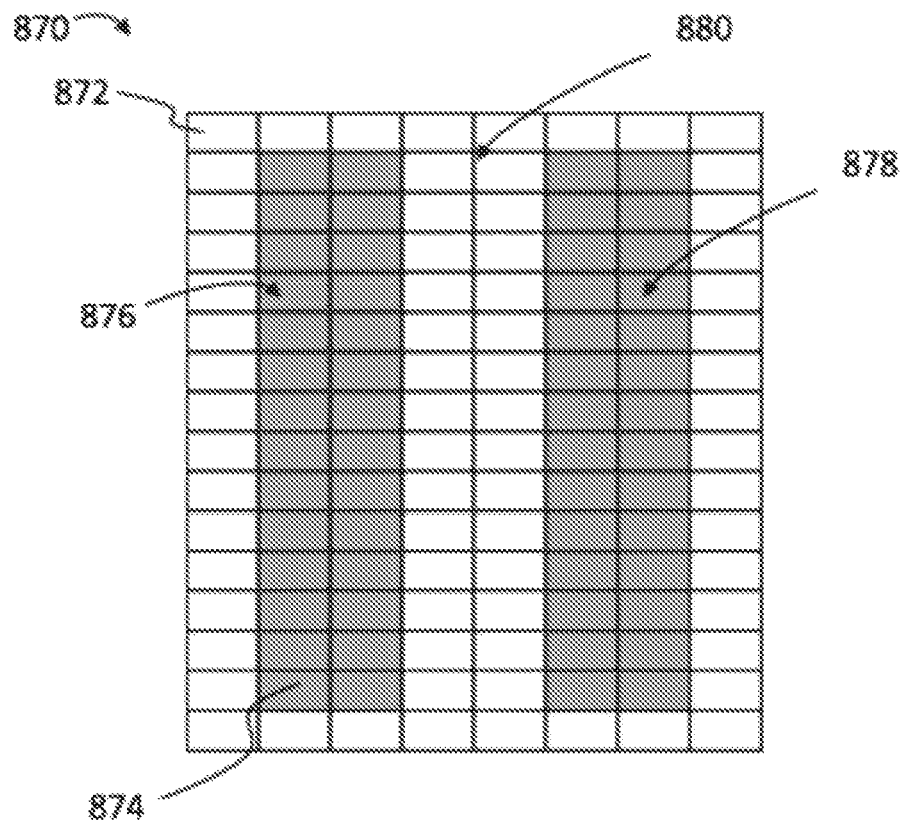
FIG. 8C is an overhead view of a mask that is used to search a map for substantially parallel objects in accordance with the principles of the present disclosure.

In another example implementation, FIG. 8C illustrates an example mask 870 that can be used to search map 700 for parallel objects, such as objects 808, 810, 812. Mask 870 can be a structural template that can be visualized as a matrix, wherein each cell of the matrix represents pixels or groups of pixels of map 700, and their corresponding pixel states. As used in certain applications in the art, mask 870 can also be referred to as a filter. Mask 870 can be stored in memory 302 and/or part of software configured to process map 700. In some implementations, mask 870 can be sized (e.g., as an m×n matrix with m pixels in the x direction and n pixels in the y direction) based at least in part on map 700 and the size of objects 808, 810, 812. For example, the size of mask 870 can be predetermined based at least in part on a percentage of the total pixel dimensions (e.g., 5%, 10%, 15%, 20%, 25%, or more) of map 700, or based at least in part on known approximate measurements of objects 808, 810, 812. In some cases, mask 870 can change in size through iterations of search methods, where mask 870 begins searching map 700 as a first size, and then searches map 700 again as a second size, and searches map 700 again as a third size, and so on and so forth for a predetermined number of times. For example, mask 870 can begin as a larger mask and in subsequent iterations become a smaller mask. Note, the size of mask 870 illustrated in FIG. 8C is for illustration purposes and may not be to scale.

Mask 870 can search map 700 by sweeping across and around map 700 and comparing the contents of mask 870 with that of map 700. For example, mask 870 can be a matrix, each cell of the matrix having values corresponding at least in part to the pixel states of map 700 (e.g., clear (e.g., navigable) location, blocked (e.g., not navigable location), unknown location, should not be traveled to, part of navigable route, traveled to, not traveled, object, water, and/or any other categorization of map 700 described in this disclosure). Cell 872 of the matrix, or any other cell (e.g., the top right corner cell, bottom left corner cell, bottom right corner cell, middle cell, or any other cell in mask 870) can align sequentially with one or more or all of the pixels of map 700. As that cell aligns with each pixel of map 700, the other cells of mask 870 can also align with the surrounding pixels in map 700. Each pixel aligned from map 700 can be compared to the corresponding pixel of mask 870 to detect the similarities between mask 870 and the region of map 700 to which it is aligned.

As illustrated, mask 870 defines structures 876, 878, which can be indicative at least in part of parallel objects (e.g., two of objects 808, 810, 812). The cells of structures 876, 878 (e.g., cell 876) can have values indicative of certain characteristics of the searched for objects. For example, each of the cells of structures 876, 878 can have a value indicative at least in part of an object of map 700 (e.g., indicative at least in part of the pixel state for an object in map 700). Between structures 876, 878 can be structure 880, whose pixels can have values indicative of a clear location. In this way, in some implementations, structures 876, 878 can represent shelves and structure 880 can represent an aisle between them. Each cell of mask 870 can accordingly have values indicative of the expected pixels of map 700. The designations of cells in mask 870 can reflect the pattern of pixels of which map 700 is searched. In some implementations, in iterative searches, mask 870 can rotate and/or change orientations. Advantageously, this can allow mask 870 to search map 700 for items that may be tilted at an angle, and/or map 700 itself may be tilted at an angle.

When mask 870 identifies groups of pixels in map 700 substantially matching (e.g., having a predetermined matching threshold of, for example, 70%, 80%, 90% or more), the cell values of mask 870, in the structure of mask 870, robot 102 can generate an indication (e.g., message, value, or command) that robot 102 has found matches between mask 870 and map 700 and/or the location of such matches. In some cases, where too few matches are found (e.g., based on a predetermined number of expected items to be found), robot 102 can detect mapping errors in map 700 and/or determine that map 700 is not good quality. In some cases, where too many matches are found (e.g., when mask 870 is configured to identify undesirable structures), robot 102 can also detect mapping errors in map 700 and/or determine that map 700 is not good quality. In either case, robot 102 can then prompt the user 604 to demonstrate the route again (e.g., via user interface units 322).

Figure 9A:
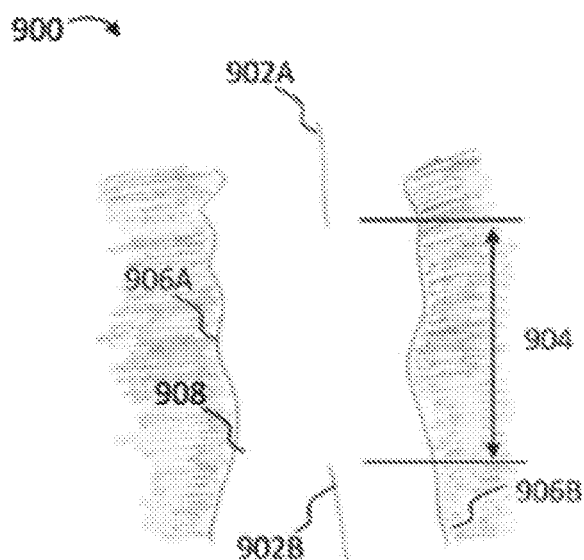
FIG. 9A is an overhead view of an exemplary route discontinuity between route portions of a map in accordance with the principles of the present disclosure.

As another example, in some implementations, robot 102 can look for points of discontinuity in map 700 and/or route 716. For example, FIG. 9A illustrates example route discontinuity 904 between example route portion 902A and example route portion 902B of example mapped portion 900. Mapped portion 900 can be a portion of map 700. Mapped portion 900 can comprise objects 906A-906B and clear space 908 there between. Within clear space 908, a route is illustrated with route portion 902A and route portion 902B. Between route portion 902A and route portion 902B is route discontinuity 904. Route discontinuity 904 can be indicative at least in part of an error because robot 102 likely did not go from route portion 902A to route portion 902B, or vice versa, without going into any space in-between. In some cases, route discontinuity 904 may not be an issue for robot 102 to navigate mapped route 716 because robot 102 can travel across clear space 908 from route portion 902A to route portion 902B without issue. However, route discontinuity 904, by itself or in combination with other route discontinuities and/or errors, can be indicative at least in part of mapping errors and/or the quality of map 700 (e.g., that map 700 is of poor quality).

In detecting mapping errors and/or evaluating the quality of map 700, robot 102 can consider the size of route discontinuity 904 (e.g., the number of pixels, the distance, etc. of route discontinuity 904) and also if there are other route discontinuities elsewhere in map 700. In some cases, where route discontinuity 904 is of a size above a predetermined size threshold (e.g., stored in memory 302), robot 102 can detect mapping errors and/or determine that map 700 is of poor quality. The predetermined size threshold can be measured in absolute distance measurements using standard units, such as inches, feet, meters, or any other unit of measurement (e.g., measurements in the metric, US, or other system of measurement) or measured in relative (or non-absolute) units, such as ticks, pixels, percentage of range of a sensor, and the like. This predetermined size threshold can be determined at least in part on one or more factors including: the signal resolution and/or fidelity of sensors (e.g., of sensor units 314) of robot 102; the complexity of environment 100; empirical correlations between route discontinuities with robot 102 and mapping errors/poor map quality; the ability of robot 102 to navigate with route discontinuity 904; and/or other factors. For example, if the signal resolution and/or fidelity of sensors of robot 102 are low, robot 102 can expect that there will be some route discontinuity in mapping (e.g., route discontinuity 904) and such route discontinuities could be of a larger size. The presence of these route discontinuities might not be indicative at least in part of mapping errors and/or poor map quality, thus the predetermined size threshold could be relatively high. In contrast, where the signal resolution and/or fidelity of sensors of robot 102 are high, route discontinuity 904 may be unexpected, and even a route discontinuity of a small size might be indicative at least in part of map errors and/or poor map quality, thus the predetermined size threshold could be relatively low. As another example, a highly complex environment 100 may strain the mapping and localizing capabilities (e.g., of mapping and localization units 312) of robot 102, and discontinuity 904 may be expected, thus the predetermined size threshold may be relatively high. In contrast, a relatively simple environment 100 may not strain the mapping and localizing capabilities of robot 102, and route discontinuity 904 may not be expected, thus the predetermined size threshold may be relatively low. As another example, where safety of an environment is a concern, the predetermined size threshold may be relatively low. As another example, robot 102 may have prior maps (or maps aggregated on a server) whose map quality (and/or lack of mapping errors) have been independently evaluated (e.g., by a user or other person).

Robot 102 can then consider the correlation between the size of route discontinuities in determining the predetermined size threshold in detecting mapping errors and/or evaluating the quality of map 700 based at least in part on discontinuity 904 and/or other route discontinuities. As another example, the predetermined size threshold may be based at least in part on the ability of robot 102 to navigate map 700. After route discontinuity 904 becomes larger than a predetermined size threshold, robot 102 may no longer be able to navigate map 700, thus robot 102 can detect mapping errors and/or determine map 700 is of poor quality. In any case of detected error and/or determination of poor quality, robot 102 can then prompt user 604 to demonstrate the route again (e.g., via user interface units 322).

Similarly, route discontinuity 904 may be one of a plurality of route discontinuities of map 700. Robot 102 can consider these other route discontinuities. If the number of route discontinuities is above a predetermined number threshold (e.g., stored in memory 302), robot 102 can detect mapping errors and/or determine that map 700 is of poor quality. For example, this predetermined number threshold can be determined at least in part on one or more factors including: the signal resolution and/or fidelity of sensors (e.g., of sensor units 314) of robot 102; the complexity of environment 100; empirical correlations between route discontinuities with robot 102 and mapping errors/map quality; the ability of robot 102 to navigate with route discontinuity 904; and/or other factors. For example, if the signal resolution and/or fidelity of sensors of robot 102 are low, robot 102 can expect that there will be some route discontinuity in mapping (e.g., route discontinuity 904). The presence of these route discontinuities might not be indicative at least in part of mapping errors and/or poor map quality, thus the predetermined number threshold could be relatively high. In contrast, where the signal resolution and/or fidelity of sensors of robot 102 are high, discontinuity 904 may be unexpected, and the presence of route discontinuities might be indicative at least in part of mapping errors and/or poor map quality, thus the predetermined number threshold could be relatively low. As another example, a highly complex environment 100 may strain the mapping and localizing capabilities (e.g., of mapping and localization units 312) of robot 102, and route discontinuity 904 may be expected, thus the predetermined number threshold may be relatively high. In contrast, a relatively simple environment 100 may not strain the mapping and localizing capabilities of robot 102, and route discontinuity 904 may not be expected, thus the predetermined number threshold may be relatively low. As another example, where safety of an environment is a concern, the predetermined number threshold may be relatively low. As another example, robot 102 may have prior maps (or maps aggregated on a server) whose map quality (and/or lack of mapping errors) have been independently evaluated (e.g., by a user or other person). Robot 102 can then consider the correlation between the number of route discontinuities in determining the predetermined number threshold in detecting mapping errors and/or evaluating the quality of map 700 based at least in part on route discontinuity 904 and/or other route discontinuities. As another example, the predetermined number threshold may be based at least in part on the ability of robot 102 to navigate map 700. After the predetermined number threshold of route discontinuities substantially like route discontinuity 904, robot 102 may no longer be able to navigate map 700, thus robot 102 can detect mapping errors and/or determine map 700 is of poor quality. In any case of detected error and/or determination of poor quality, robot 102 can then prompt the user 604 to demonstrate the route again (e.g., via user interface units 322).

In some cases, hybrid thresholds can be used where the above described predetermined size threshold and predetermined number threshold are used in combination. For example, the predetermined number threshold, above which map 700 is determined to contain mapping errors and/or be poor quality, may be based at least in part on the number of route discontinuities above the predetermined size threshold. In the case where mapping errors are detected and/or map 700 is determined to be of poor quality, robot 102 can then prompt user 604 to demonstrate the route again (e.g., via user interface units 322).

Figure 9B:
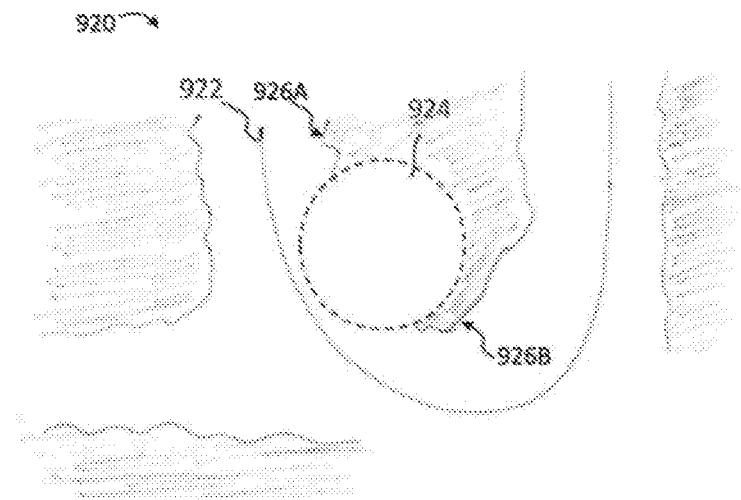
FIG. 9B is an overhead view of an object discontinuity between object portions of a map in accordance with the principles of the present disclosure.

FIG. 9B illustrates example object discontinuity 924 between example object portion 926A and example object portion 926B of example mapped portion 920. Mapped portion 920 can be a portion of map 700. As illustrated, route portion 922 may not have any route discontinuities. However, between object portion 926A and object portion 926B, there can be object discontinuity 924 where a portion of the object has not been mapped. Object discontinuity 924 can be indicative of an error because object discontinuity 924 is likely an unmapped portion of map portion 924 in a position where it should have been mapped. In some cases, object discontinuity 924 may not be an issue for robot 102 to navigate because robot 102 could detect the presence of the object with its sensors as it navigates through route portion 922. However, object discontinuity 924, by itself or in combination with other discontinuities and/or other characteristics of mapping errors, can be indicative of mapping errors and/or a poor quality map.

Similar to the detection of mapping errors and/or evaluation of quality described with reference to FIG. 9A, in evaluating map 700, robot 102 can consider the size of object discontinuity 924 (e.g., the number of pixels, the distance, etc. of object discontinuity 924) and also if there are other object discontinuities elsewhere in map 700. In some cases, where object discontinuity 924 is of a size above a predetermined size threshold (e.g., stored in memory 302), robot 102 can determine that map 700 has mapping errors and/or is of poor quality. For example, this predetermined size threshold can be determined at least in part on one or more factors including: the signal resolution and/or fidelity of sensors (e.g., of sensor units 314) of robot 102; the complexity of environment 100; empirical correlations between object discontinuities with robot 102 and mapping errors/map quality; the ability of robot 102 to navigate with object discontinuity 924; and/or other factors. For example, if the signal resolution and/or fidelity of sensors of robot 102 are low, robot 102 can expect that there will be some object discontinuity in mapping (e.g., discontinuity 904) and such object discontinuities could be of a larger size. The presence of these object discontinuities might not be indicative at least in part of mapping errors and/or poor map quality, thus the predetermined size threshold could be relatively high. In contrast, where the signal resolution and/or fidelity of sensors of robot 102 are high, object discontinuity 924 may be unexpected, and even a discontinuity of a small size might be indicative at least in part of mapping errors and/or poor map quality, thus the predetermined size threshold could be relatively low. As another example, a highly complex environment 100 may strain the mapping and localizing capabilities (e.g., of mapping and localization units 312) of robot 102, and object discontinuity 924 may be expected, thus the predetermined size threshold may be relatively high. In contrast, a relatively simple environment 100 may not strain the mapping and localizing capabilities of robot 102, and object discontinuity 924 may not be expected, thus the predetermined size threshold may be relatively low. As another example, where safety of an environment is a concern, the predetermined size threshold may be relatively low. As another example, robot 102 may have prior maps (or maps aggregated on a server) whose map quality (and/or lack of mapping errors) have been independently evaluated (e.g., by a user or other person). Robot 102 can then consider the correlation between the size of object discontinuities in determining the predetermined size threshold in detecting mapping errors and/or evaluating the quality of map 700 based at least in part on object discontinuity 924 and other object discontinuities. As another example, the predetermined size threshold may be based at least in part on the ability of robot 102 to navigate map 700. After object discontinuity 924 becomes larger than a predetermined size, robot 102 may no longer be able to navigate map 700, thus robot 102 can detect mapping errors and/or determine map 700 is of poor quality. In any case of detected error and/or determination of poor quality, robot 102 can then prompt the user to demonstrate the route again (e.g., via user interface units 322).

Similarly, object discontinuity 924 may be one of a plurality of object discontinuities of map 700. Robot 102 can consider these other object discontinuities. If the number of object discontinuities is above a predetermined number threshold (e.g., stored in memory 302), robot 102 can detect mapping errors and/or determine that map 700 is of poor quality. For example, this predetermined number threshold can be determined at least in part on one or more factors including: the signal resolution and/or fidelity of sensors (e.g., of sensor units 314) of robot 102; the complexity of environment 100; empirical correlations between object discontinuities with robot 102 and mapping errors/map quality; the ability of robot 102 to navigate with object discontinuity 924; and/or other factors. For example, if the signal resolution and/or fidelity of sensors of robot 102 are low, robot 102 can expect that there will be some object discontinuity in mapping (e.g., discontinuity 904). The presence of these object discontinuities might not be indicative of mapping errors and/or poor map quality, thus the predetermined number threshold could be relatively high. In contrast, where the signal resolution and/or fidelity of sensors of robot 102 are high, object discontinuity 924 may be unexpected, and the presence of object discontinuities might be indicative at least in part of mapping errors and/or poor map quality, thus the predetermined number threshold could be relatively low. As another example, a highly complex environment 100 may strain the mapping and localizing capabilities (e.g., of mapping and localization units 312) of robot 102, and object discontinuity 924 may be expected, thus the predetermined number threshold may be relatively high. In contrast, a relatively simple environment 100 may not strain the mapping and localizing capabilities of robot 102, and object discontinuity 924 may not be expected, thus the predetermined number threshold may be relatively low. As another example, where safety of an environment is a concern, the predetermined number threshold may be relatively low. As another example, robot 102 may have prior maps (or maps aggregated on a server) whose map quality (and/or lack of mapping errors) have been independently evaluated (e.g., by a user or other person). Robot 102 can then consider the correlation between the number of object discontinuities in determining the predetermined number threshold in detect mapping errors and/or evaluating the quality of map 700 based at least in part on object discontinuity 924 and other discontinuities. As another example, the predetermined number threshold may be based at least in part on the ability of robot 102 to navigate map 700. After a predetermined number of object discontinuities substantially like object discontinuity 924, robot 102 may no longer be able to navigate map 700, thus robot 102 can detect mapping errors and/or determine map 700 is of poor quality. In any case of detected error and/or determination of poor quality, robot 102 can then prompt the user to demonstrate the route again (e.g., via user interface units 322).

In some cases, hybrid thresholds can be used where the above described predetermined size threshold and predetermined number threshold are used in combination. For example, the predetermined number threshold, above which map 700 is determined to have mapping errors and/or be poor quality, may be based at least in part on the number of object discontinuities above the predetermined size threshold. In the case mapping errors are detected and/or map 700 is determined to be of poor quality, robot 102 can then prompt user 704 to demonstrate the route again (e.g., via user interface units 322).

Figure 9C:
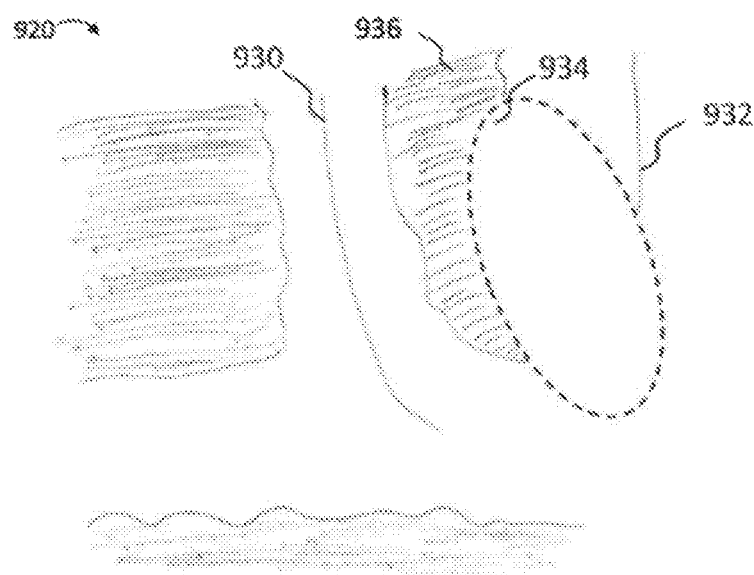
FIG. 9C is an overhead view of a mapped portion that has an exemplary discontinuity that includes both a route discontinuity and an object discontinuity in accordance with the principles of the present disclosure.

FIG. 9C illustrates an example mapped portion 920 that has discontinuity 934, which includes both a route discontinuity and an object discontinuity. Mapped portion 920 can be a portion of map 700. Discontinuity 934 can be a discontinuity between route portion 930 and route portion 932. Discontinuity 934 can also be a discontinuity in object 936. As described with reference to FIGS. 9A-C, both route discontinuities and object discontinuities can be indicative at least in part of mapping errors and/or poor map quality. When robot 102 evaluates map 700, robot 102 can consider either route discontinuities or object discontinuities, or both together, in detect mapping errors and/or determining the quality of map 700.

Figure 10:
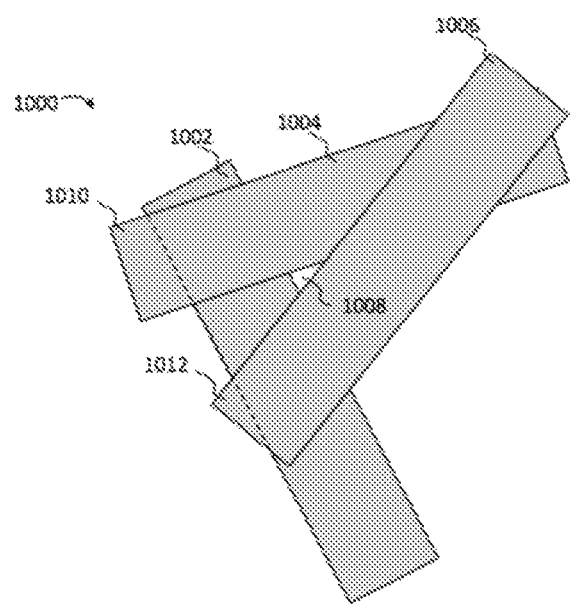
FIG. 10 is an overhead view of a mapped portion having exemplary overlapping objects in accordance with the principles of the present disclosure.

As another example, in some implementations, robot 102 can evaluate the amount of overlap between items (e.g., routes, obstacles, or other objects) in map 700 in detecting mapping errors and/or determining the quality of map 700. FIG. 10 illustrates example mapped portion 1000 having overlapping objects 1002, 1004, 1006. Mapped portion 1000 can be a portion of map 700. As illustrated, objects 1002, 1004, 1006 can be walls, objects, shelves, etc. that robot 102 detected while creating map 700. Based at least in part on the measured positioning and orientation of robot 102, robot 102 mapped objects 1002, 1004, 1006. Because the estimated position and/or orientation of each of objects 1002, 1004, 1006 are on top of each other, robot 102 can determine that there has been an error in mapping. In identifying such areas of overlap, robot 102 can examine map 700 pixel-by-pixel or region-by-region. In some cases, robot 102 can use a mask and/or filter to find predetermined shapes within map 700 (e.g., substantially similar to mask 870 modified to look for the predetermined shape). The predetermined shapes can be based at least in part on known errors of robot 102 in mapping, such as previously observed transformations of object locations and/or sensor errors.

Overlap can also be identified at least in part by a heavy density of detected objects 1002, 1004, 1006 in and/or around a pixel or region of pixels. In some cases, robot 102 can detect shapes in map 700, namely irregularity in shapes. For example, robot 102 can detect entrapped spaces, such as space 1008. In some cases, space 1008 may be a clear, travelled to, and/or navigable space. Space 1008 would not normally occur between objects 1002, 1004, 1006 because robot 102 would not have access to space 1008 as mapped. Accordingly, robot 102 can determine that map 700 has mapping errors and/or is of poor quality if it detects space

1008. As another example, robot 102 can detect jagged overhangs 1010, 1012. The irregularity of the shape can allow robot 102 to determine that there has been an error mapping in one or more of objects 1002, 1004, 1008 because such overhangs would not normally occur in environment 100. Accordingly, based at least in part on the irregularity of overhangs 1010, 1012, robot 102 can detect mapping errors and/or determine that map 700 is of poor quality.

As another example of a mapping error identifiable through recognizing overlap, robot 102 (and/or the route robot 102 travels) can be represented in map 700 as passing through objects. Because it is unlikely that robot 102 would pass through objects, such an occurrence can be indicative at least in part of a mapping error.

As another example, robot 102 can identify mapping errors and/or the quality of map 700 by comparing map 700 with data from at least one of robot 102's sensors. For example, in some implementations, map 700 was generated using at least in part one or more of sensors 560A-560D and one or more of sensors 568A-568B. However, a check on the accuracy of map 700 can compare map 700 to data recorded by fewer than all of sensors 560A-560D and sensors 568A-568B. As one illustrative example, one or more of sensors 568A-B can determine the odometry of robot 102. A representation of a route of robot 102 based only on the odometry can be considered a map in the odometry frame. This map in the odometry frame can be compared to map 700, such as using a comparator, subtraction, and/or any other method of comparing maps in this disclosure. If the deviation between the map in the odometry frame and map 700 exceeds a predetermined threshold (e.g., more than 40%, 50%, 60%, or any percentage determined based at least in part on empirical determinations of a correlation to poor map quality), robot 102 can determine that there were mapping errors and/or map 700 was of poor quality.

Figure 11A:
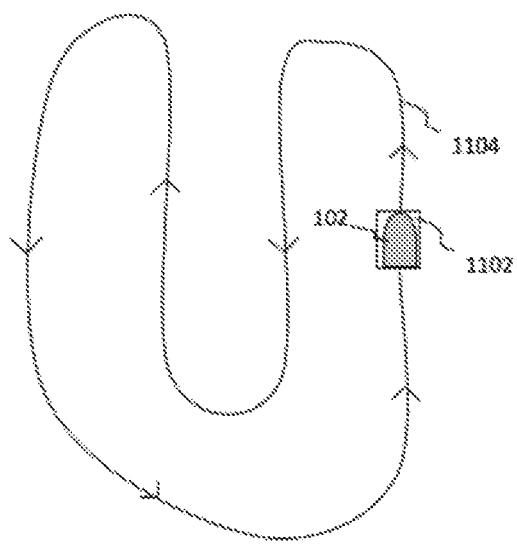
FIG. 11A is an overhead view of a robot travelling in an exemplary closed loop route, where the example initialization location is substantially similar to the example end location in accordance with the principles of the present disclosure.

As another example, in some implementations, robot 102 can be configured to travel in a closed loop (e.g., the end location is substantially similar to the initialization location). It should be noted that robot 102 may not always travel in a closed loop. For example, FIG. 1A illustrated a route that did not form a closed loop because initialization location 104 was illustrated as not in substantially the same location as end location 114. FIG. 11A illustrates robot 102 travelling in example closed loop route 1104, where location 1102 is both the initialization location and the end location. In this case, if the map of route 1104 did not have the initialization location and end location approximately at location 1102, robot 102 can detect mapping errors and/or determine that the map was of poor quality. In some cases, there can be a predetermined distance threshold (e.g., stored in memory 302). If the mapped initialization location and end location are not within the predetermined distance threshold (e.g., if the distance between the initialization location and end location does not exceed the predetermined distance threshold), robot 102 can detect mapping errors and/or determine the map is of poor quality. This predetermined distance threshold can be determined based at least in part on the size of the map (e.g., the predetermined distance threshold can be a percentage of map size), sensor resolution and/or fidelity, and/or other factors.

As another example implementation, robot 102 can have an uploaded map of the environment stored in memory 302. Robot 102 can then compare map 700 to the uploaded map. By way of illustration, robot 102 can utilize one or more comparators of map evaluation units 324 that compares map 700 with an uploaded map on a pixel-by-pixel or region-by-region basis. In some implementations, uploaded map and/or map 700 may be resized to facilitate that comparison. Where map 700 is not found to be similar to the uploaded map on a pixel-by-pixel or region-by-region basis, robot 102 can determine that there has been a mapping errors and/or that map 700 is of poor quality. Consequently, robot 102 can prompt the user 604 to demonstrate the route again (e.g., robot 102 can perform portion 404 again).

In some implementations, a percentage similarity can be computed between the uploaded map and map 700, where the percentage similarity reflects, at least in part, how similar the uploaded map is to map 700. Where the percentage similarity falls below a predetermined threshold (e.g., 70%, 80%, 90%, or any percentage indicative at least in part of substantial similarity between the uploaded map and map 700), robot 102 can determine that there has been a mapping error and/or that map 700 is of poor quality. Consequently, robot 102 can prompt (e.g., via user interface units 322) user 604 to demonstrate the route again (e.g., robot 102 can perform portion 404 again).

In some implementations, the uploaded map can be analyzed for shapes (e.g., shapes of objects or clear spaces). Map 700 can be analyzed for those same shapes to determine, at least in part, if those same shapes are present in map 700. A mask and/or filter can be used for the search in some implementations (e.g., substantially similar to mask 870 modified to look for the shapes). If the shapes from the uploaded map are not found in map 700, then robot 102 can determine that there has been a mapping error and/or that map 700 is of poor quality. Consequently, robot 102 can prompt (e.g., via user interface units 322) the user 604 to demonstrate the route again (e.g., robot 102 can perform portion 404 again). Similarly, map 700 can be analyzed for shapes (e.g., shapes of objects or clear spaces), and the uploaded map analyzed to see if those same shapes are present. In the same way, if robot 102 does not find detected shapes from map 700 in the uploaded map, robot 102 can determine that there has been a mapping error and/or that map 700 is of poor quality and prompt (e.g., via user interface units 322) the user 604 to demonstrate the route again (e.g., robot 102 can perform portion 404 again).

In some implementations, robot 102 can analyze map 700 for certain expected characteristics/features of an environment 100. For example, in a grocery store or similar environment, robot 102 might expect aisles and/or rows of shelves. Where robot 102 does not detect objects indicative of aisles and/or rows of shelves, or detects too few or too many, robot 102 can determine map 700 may be of poor quality and/or contains mapping errors. As another example, there may be a certain level of expectation on the complexity of an environment. Where map 700 has too many turns or too few turns, robot 102 can determine that map 700 may be of poor quality and/or contains mapping errors. As another example, environment 100 can have an expected size. Where the size of map 700 is too large or too small, robot 102 can determine that map 700 may be of poor quality and/or contains mapping errors. In any of the aforementioned cases where map 700 does not have the certain expected characteristics/features of an environment 100, robot 102 can prompt a user (e.g., user 604 or a user with access to the map on a server) to verify map 700. Accordingly, robot can send the map to the server and receive a verification of the quality of the map.

In some implementations, machine learning algorithms can be used, wherein robot 102 (e.g., controller 304 of robot 102) learns to identify good maps and bad maps. For example, robot 102 can have a library of maps that have been identified (e.g., hand labeled or machine labeled) as good maps and bad maps. Using supervised or unsupervised algorithms known in the art, robot 102 can then learn to associate characteristics robot 102 determines across its library as being indicative of a good map or a bad map. Accordingly, where robot 102 identifies a map as a bad map, robot 102 can determine that there has been a mapping error and/or that map 700 is of poor quality and prompt (e.g., via user interface units 322) the user 604 to demonstrate the route again (e.g., robot 102 can perform portion 404 again).

In some circumstances, robot 102 can also correct errors in a map 700 of poor quality. For example, in some cases, where robot 102 did not travel exactly in a closed loop (e.g., closed loop route 1104), the difference between the initialization location and end location can be used to correct the odometry of robot 102. For example, robot 102 can take the difference between the initialization location and end location and determine that the difference is indicative of how much the odometry drifted from the actual. Accordingly, robot 102 can adjust a recorded route to take into account that determined drift.

Figure 11B:
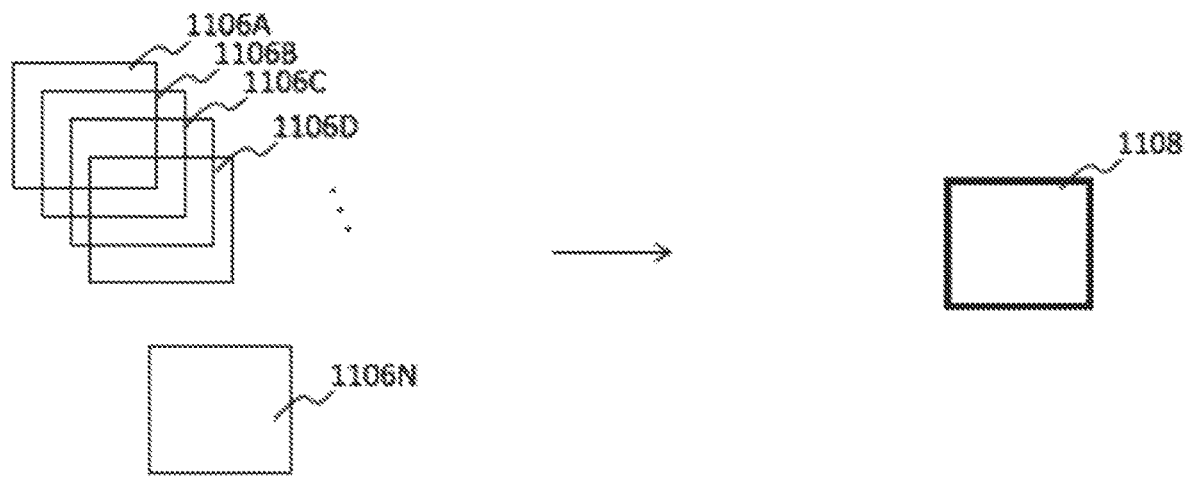
FIG. 11B is an exemplary mapping error where a robot associates the mapping error with a corrected route in accordance with the principles of the present disclosure.

As another example, certain mapping errors can result in patterns that robot 102 can associate with at least a portion of a corrected map, which can be version of map 700 correcting one or more errors. FIG. 11B illustrates an example where example robot 102 associates an example mapping error with an example corrected route 1108. For example, map 700 can contain a series of drifted routes of substantially similar shapes, such as mapped routes 1106A-1106N, where N is indicative that any number of mapped routes 1106A-1106N can be mapped. Robot 102 can determine that such drifted mapped routes 1106A-1106N can be indicative at least in part of a user 604 navigating the same route over and over again. As a result, robot 102 can then correct mapped routes 1106A-1106N to mapped route 1108, which is indicative of user 604 navigating the same route repeatedly. Where map 700 contained mapped routes 1106A-1106N, robot 102 can correct mapped routes 1106A-1106N to mapped route 1108 in map 700. Similarly, there can be other error patterns (e.g., drifts and/or other errors) whose identity can be programmed into robot 102 such that robot 102 can automatically correct them. Accordingly robot 102 can correct errors of map 700.

Robot 102 can also use machine learning to learn to associate errors with corrections of those errors. For example, robot 102 can store in memory 302 and/or on a server maps with errors. By way of illustration, in some cases, user 604 can first demonstrate a route. The map created of the route and the surrounding environment can contain mapping errors. When confronted with the mapping errors, user 604 may remap the environment and/or route. Accordingly, robot 102 can have a version of a poor quality map (e.g., with mapping errors that would prevent successful navigation) and a version that is not of poor quality (e.g., without mapping errors that would prevent successful navigation). Robot 102 can then associate at least a portion of the poor quality map with a corresponding portion of the remapped version that is not of poor quality. Based on one or more substantially similar associations, robot 102 can learn to identify a mapping error that has occurred and then produce at least a portion of the corrected map once it has recognized the mapping error.

Returning to FIG. 4, after teaching phase 414, robot 102 can then enter autonomous phase 416. In portion 408, robot 102 can detect initialization location 104 and initialize the position and/or orientation of robot 102. In some implementations, a user can bring robot 102 to initialization location 104 by driving robot 102, remote controlling robot 102, steering robot 102, pushing robot 102, and/or any other control, such as any control that drives actuator units 318. In some implementations, robot 102 can return to initialization location 104 autonomously. For example, robot 102 can store in memory 302 the location of initialization location 104 (e.g., as previously described with reference to FIGS. 5B-5E) and return to that location.

In some implementations, robot 102 can detect initialization location 104 in a way substantially similar to the systems and methods it used to detect initialization location 104 in portion 402 described with reference to FIGS. 5B-5E as well as elsewhere throughout this disclosure. In some cases, when robot 102 returns to initialization location 104 in portion 408, robot's 102 position relative to, for example, one or more of objects 512, 546, 548, 550 will have been stored in memory 302 (e.g., from portion 402). When robot 102 detects it is in the same relative location with respect to one or more of objects 512, 546, 548, 550, robot 102 can determine that robot 102 is in initialization location 104. In some implementations, robot 102 can detect it is in initialization location 104 based at least in part on where the user stopped robot 102. As such, it can assume where the user stopped, and subsequently selected a route as will be described with reference to portion 410, is initialization location 104. In some implementations, there can be a transmitter (e.g., a transmitter that transmits communications using RFID, NFC, BLUETOOTH®, radio transmission, radio frequency field, and/or any other communication protocol described in this disclosure) at, or substantially close to, initialization location 104. When robot 102 detects that it is on top of, or substantially close to the transmitter, robot 102 can detect that robot 102 is in initialization location 104. In some cases, the transmitter can have an operable range such that robot 102 can detect a communication from the transmitter only when it is in the starting location. By way of illustrative example, the transmission range of NFC can be ten centimeters or less. Accordingly, when robot 102 receives a transmission via NFC, robot 102 can detect that it is positioned in initialization location 104. In some implementations, robot 102 can receive the transmission from the transmitter and calculate the distance to the transmitter based at least in part on the attenuation of the signal strength. In this way, robot 102 can detect how close it is to the transmitter, and consequently, the position of robot 102 relative to the transmitter and/or initialization location 104. In some implementations, robot 102 can determine its location by triangulating the signal strength of a plurality of transmitters. In some implementations, initialization location 104 can be demarcated by a sign (e.g., markings, symbols, lines, etc.) on the floor. When one or more sensors of robot 102 (e.g., of sensor units 314) detect the sign on the floor, robot 102 can detect that robot 102 is positioned in initialization location 104.

Figure 12:
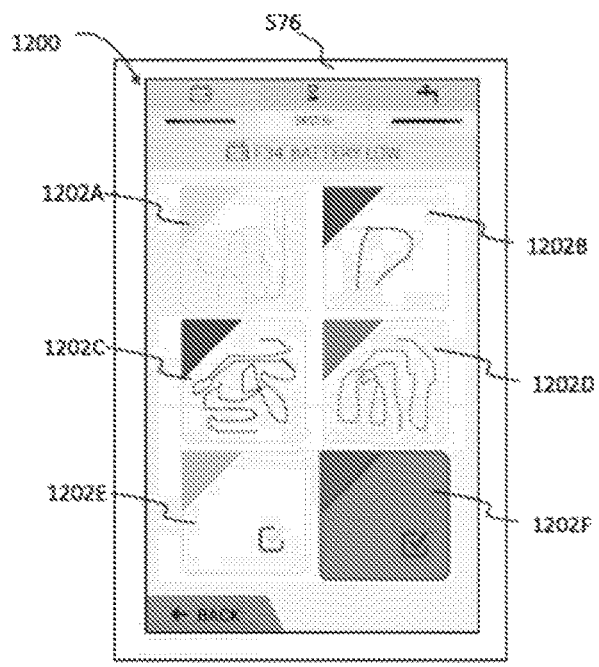
FIG. 12 is an example user interface that can be used for route selection in accordance with the principles of the present disclosure.

In portion 410, robot 102 can then select a recorded route to navigate autonomously. In some implementations, the selection of the recorded route (e.g., route 116) by robot 102 can be based at least in part on user input. For example, a user can select input 572 on user interface 500 (illustrated in FIG. 5A) on display 576, where input 572 can allow a user to select a recorded route of robot 102. After selecting input 572, interface 1200, illustrated in FIG. 12, can appear. FIG. 12 illustrates example interface 1200, which can be used for route selection. Interface 1200 can present a plurality of routes for selection displayed as selectable inputs 1202A-1202F. A user may select one of selectable inputs 1202A-1202F via touch (e.g., in the case display 576 includes a touch screen) and/or any other input mechanism of user interface units 322. For example, in some implementations, input 1202F can correspond with mapped route 716 learned by robot 102. When the user selects input 1202F, robot 102 can then select map 700 and mapped route 716 (which is based upon the user's demonstration of route 116) based at least in part on the user's selection.

In some implementations, robot 102 can automatically select a recorded route based on the initialization location it detected in portion 408. For example, initialization location 104 can be associated with only demonstrated route 116 (or as mapped as mapped route 716). Similarly, robot 102 can have other initialization locations associated with other demonstrated routes. Advantageously, having a plurality of initialization locations can allow a user to demonstrate, and allow robot 102 to move autonomously through, a variety of routes. Moreover, by having robot 102 automatically select a recorded route based on the initialization location, robot 102 can more quickly begin autonomous navigation with minimal additional user input.

Returning to FIG. 4, in portion 412, robot 102 can then travel autonomously along the selected recorded route in portion 410. For example, robot 102 can travel autonomously using map 700 and mapped route 716.

In following route 716, robot 102 can rely upon at least navigation units 326, which can process one or more of at least map 700, route 716, and data from sensors 560A-560D and sensors 568A-568B. Sensors 560A-560D, as illustrated and described herein with reference to FIG. 6D and elsewhere in this disclosure, can allow robot 102 to sense objects in its surrounding. In this way, robot 102 can navigate based at least in part on map 700 and the detection of nearby objects, wherein robot 102 can avoid objects that are detected. For example, these objects may be temporarily placed and/or transient items, and/or transient and/or dynamic changes to the environment. The detection of nearby objects can also enable robot 102 to localize itself on map 700 based at least in part on a determination of the position of the objects robot 102 detects on map 700.

Robot 102 can also utilize sensors 568A-568B for odometry to determine at least in part its position/pose (e.g., distance and/or orientation) relative to an origin, as described with reference to at least FIGS. 5B-5D. By using one or more of at least map 700, route 716, sensors 560A-560D, and sensors 568A-568B, robot 102 can travel autonomously through route 106, such as illustrated in FIG. 1A, route 126, as illustrated in FIG. 1C, or other autonomous routes through environment 100, or any other environment, utilizing at least method 400.

Also while autonomously travelling along route 106, robot 102 can actuate various instruments on robot 102, such as brush 908 and/or squeegee 616 as learned during portion 404 and/or recorded in map 700. The actuation of learned actions of instruments of a scrubber, or any other robot form, can also be similarly be performed, such as turning on/off water, spraying water, turning on/off vacuums, moving vacuum hose positions, gesticulating an arm, raising/lowering a lift, turning a camera and/or any sensor of sensor units 314, and/or any movement desired for robot 102 to perform an action.

Figure 13:
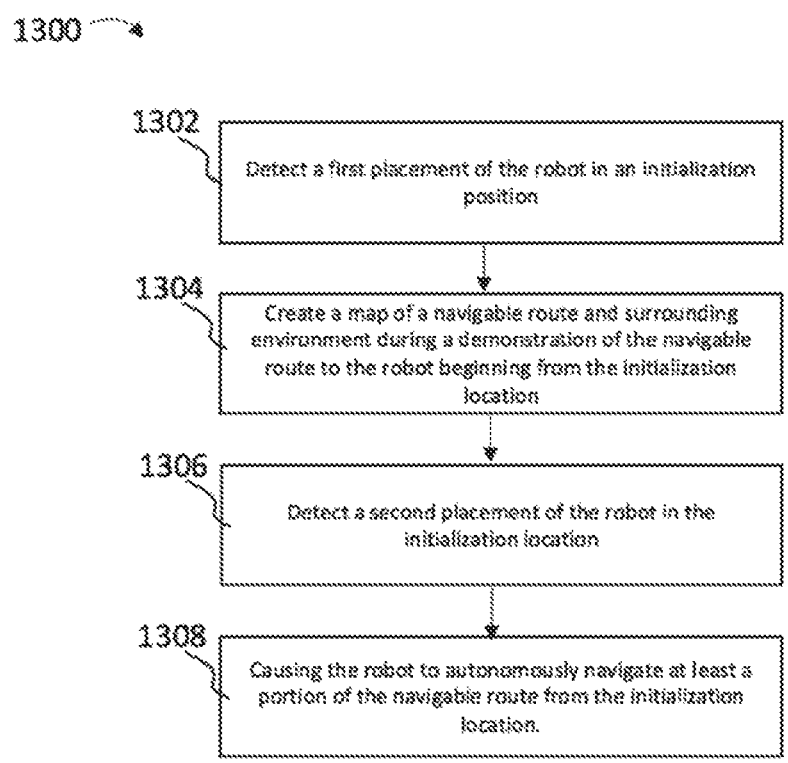
FIG. 13 is a process flow diagram of an exemplary method for operating a robot in accordance with the principles of the present disclosure.

FIG. 13 illustrates an example method 1300 for operating example robot 102. Portion 1302 includes detecting a first placement of the robot in an initialization location. Portion 1304 includes creating a map of a navigable route and surrounding environment during a demonstration of the navigable route to the robot beginning from the initialization location. Portion 1306 includes detecting a second placement of the robot in the initialization location. Portion 1308 includes causing the robot to autonomously navigate at least a portion of the navigable route from the initialization location.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A non-transitory computer-readable storage medium having a plurality of computer readable instructions stored thereon, that when executed by at least one processor, cause the at least one processor to:
   detect a first placement of a robot in an initialization location;
   generate a map of a navigable route and surrounding environment during a demonstration of the navigable route to the robot beginning from the initialization location, the demonstration comprising receipt of control signals from a user;
   detect at least one error in the map based on a number of discontinuities in one or both of a navigable route or one or more objects of the map being above a predetermined threshold, the at least one error being detected based on a presence or an absence of a predetermined pattern, the presence or the absence of the predetermined pattern being based on evaluating the map on a pixel-by-pixel basis, the predetermined threshold determined based one or more factors comprising at least one of signal strength of sensor coupled to the robot, the surrounding environment, and map quality based on identification of overlapping objects, object discontinuities, route discontinuities, identification of predetermined patterns or failure to form a closed loop in the map; and prompt the user to re-demonstrate the navigable route when the number of discontinuities is determined to be above the predetermined threshold;
   detect a second placement of the robot in the initialization location; and
   cause the robot to autonomously navigate at least a portion of the navigable route from the initialization location.

2. The non-transitory computer-readable storage medium of claim 1, wherein the at least one processor is further configured to execute the plurality of computer readable instructions to:
   transmit an alert notification to a user, the alert notification corresponding to requesting the user demonstrate the navigable route to the robot.

3. The non-transitory computer-readable storage medium of claim 1, wherein the at least one processor is further configured to execute the plurality of computer readable instructions to:
   avoid transient obstacles while autonomously navigating the navigable route.

4. The non-transitory computer-readable storage medium of claim 1, wherein the at least one processor is further configured to execute the plurality of computer readable instructions to receive a selection of the navigable route from a user interface.

5. The non-transitory computer-readable storage medium of claim 1, wherein the robot is a floor cleaner.

6. The non-transitory computer-readable storage medium of claim 1, wherein the generated map comprises an indication representative at least in part of an action performed by the robot on the navigable route.

7. The non-transitory computer-readable storage medium of claim 6, wherein the action executed by the robot includes cleaning of a floor.

8. A method of operating a robot, comprising:
   detecting an initial placement of the robot in an initialization location;
   generating a map of a navigable route and surrounding environment during a demonstration of the navigable route to the robot beginning from the initialization location, the demonstration comprising receiving control signals from a user;
   detecting at least one error in the map based on a number of discontinuities in one or both of a navigable route or one or more objects of the map being above a predetermined threshold, the at least one error being detected based on a presence or an absence of a predetermined pattern, the presence or the absence of the predetermined pattern being based on evaluating the map on a pixel-by-pixel basis, the predetermined threshold determined based one or more factors comprising at least one of signal strength of sensor coupled to the robot, the surrounding environment, and map quality based on identification of overlapping objects, object discontinuities, route discontinuities, identification of predetermined patterns or failure to form a closed loop in the map; and prompt the user to re-demonstrate the navigable route when the number of discontinuities is determined to be above the predetermined threshold;

detecting a subsequent placement of the robot in the initialization location; and causing the robot to autonomously navigate at least a portion of the navigable route from the initialization location.

9. The method of claim 8, further comprising: sensing the surrounding environment with a three-dimensional sensor.

10. The method of claim 8, further comprising: receiving a selection of the navigable route from a user interface.

11. The method of claim 8, wherein the causing of the robot to autonomously navigate comprises navigating using the map of the navigable route and surrounding environment.

12. The method of claim 8, further comprising mapping on the generated map an action performed by the robot on the navigable route, the action comprises cleaning a floor.

13. A robot, comprising:
   a memory comprising computer readable instructions stored thereon; and
   at least one processor configured to execute the computer readable instructions to:
      detect a first placement of a robot in an initialization location;
      generate a map of a navigable route and surrounding environment during a demonstration of the navigable route to the robot beginning from an initialization location;
      detect at least one error in the map based on a number of discontinuities in one or both of a navigable route or one or more objects of the map being above a predetermined threshold, the at least one error being detected based on a presence or an absence of a predetermined pattern, the presence or the absence of the predetermined pattern being based on evaluating the map on a pixel-by-pixel basis, the predetermined threshold determined based one or more factors comprising at least one of signal strength of sensor coupled to the robot, the surrounding environment, and map quality based on identification of overlapping objects, object discontinuities, route discontinuities, identification of predetermined patterns or failure to form a closed loop in the map; and prompt the user to re-demonstrate the navigable route when the number of discontinuities is determined to be above the predetermined threshold; and
      navigate the robot using the map.

14. The robot of claim 13, wherein at least one processor is further configured to execute the computer readable instructions to determine not to autonomously navigate at least a portion of the navigable route.

15. The robot of claim 13, wherein the at least one processor is further configured to execute the computer readable instructions to:
   generate sensor data indicative at least in part of objects within a sensor range of the robot, and
   autonomously navigate based at least in part on the generated sensor data.

16. The robot of claim 13, wherein the at least one processor is further configured to execute the computer readable instructions to transmit a signal for actuating a brush.

17. The robot of claim 16, wherein the at least one processor is further configured to execute the computer readable instructions to associate a position on the map with the transmission of the signal for actuating the brush.

18. The robot of claim 13, wherein the at least one processor is further configured to execute the computer readable instructions to:
   communicate with a server by transmitting the map to the server; and
   receiving a verification of indicated quality of the map.

* * * * *